US011305146B2

(12) United States Patent
Peery

(10) Patent No.: US 11,305,146 B2
(45) Date of Patent: Apr. 19, 2022

(54) ADJUSTABLE EXERCISE DEVICE

(71) Applicant: Gil Peery, Pardesiya (IL)

(72) Inventor: Gil Peery, Pardesiya (IL)

( * ) Notice: Subject to any disclaimer, the term of this patent is extended or adjusted under 35 U.S.C. 154(b) by 186 days.

(21) Appl. No.: 16/623,398

(22) PCT Filed: Jun. 21, 2018

(86) PCT No.: PCT/IL2018/050686
§ 371 (c)(1),
(2) Date: Dec. 17, 2019

(87) PCT Pub. No.: WO2018/235083
PCT Pub. Date: Dec. 27, 2018

(65) Prior Publication Data
US 2020/0171342 A1    Jun. 4, 2020

Related U.S. Application Data

(60) Provisional application No. 62/523,278, filed on Jun. 22, 2017.

(51) Int. Cl.
| | | |
|---|---|---|
| *A63B 21/00* | (2006.01) | |
| *A63B 21/04* | (2006.01) | |
| *A63B 21/055* | (2006.01) | |
| *A63B 23/035* | (2006.01) | |

(52) U.S. Cl.
CPC ...... *A63B 21/4009* (2015.10); *A63B 21/0442* (2013.01); *A63B 21/0557* (2013.01); *A63B 23/03575* (2013.01)

(58) Field of Classification Search
CPC ............ A63B 21/4009; A63B 21/0442; A63B 21/0557; A63B 23/03575; A63B 2208/0233; A63B 2208/0252; A63B 2208/0257; A63B 21/0552; A63B 21/16; A63B 23/03541; A63B 23/0355; A63B 21/00069; A63B 21/4013; A63B 21/4021; A63B 21/4025; F16G 11/048; F16M 13/04
See application file for complete search history.

(56) References Cited

U.S. PATENT DOCUMENTS

| | | |
|---|---|---|
| 5,141,223 A | 8/1992 | Block |
| 5,362,295 A | 11/1994 | Nurge |
| 5,690,595 A | 11/1997 | Quinones |
| 6,840,894 B2 | 1/2005 | Lerner |
| 9,737,752 B2 | 8/2017 | Walter et al. |
| 10,881,891 B2 * | 1/2021 | Brancato ............ A63B 21/4025 |
| 2003/0125170 A1 * | 7/2003 | Vernon ............. A63B 21/4017 |
| | | 482/124 |

(Continued)

*Primary Examiner* — Andrew S Lo

(57) ABSTRACT

A sliding clip is disclosed. The clip may slide along a strap, for example on a belt. Optionally the clip includes a fastener. Optionally, the fastener may be configured to hold one or more cords, for example bungee cords. For example, the cords may fit into a channel and/or be immobilized by a pressing them with a clamp and/or a threaded knob. Optionally the positions of the cords may be adjusted and/or the fastener may be opened for replacement of the cords. Optionally the fastener is configured for one handed use. For example the parts may be retained together even when the fastener is opened. Optionally one or more clips and/or bungee cords are mounted of a belt assembly forming an exercise device.

12 Claims, 19 Drawing Sheets

(56) References Cited

U.S. PATENT DOCUMENTS

| | | | |
|---|---|---|---|
| 2006/0073955 A1 | 4/2006 | Garcia Lopez | |
| 2007/0232404 A1 | 10/2007 | Begert | |
| 2009/0305827 A1 | 12/2009 | Webb et al. | |
| 2010/0279830 A1 | 11/2010 | Snagg | |
| 2010/0292055 A1* | 11/2010 | Andrich | A63B 21/00043 482/122 |
| 2014/0045627 A1* | 2/2014 | Dawson | A63B 69/0057 473/422 |
| 2014/0200499 A1* | 7/2014 | Champion | A63B 21/1663 602/36 |
| 2016/0339289 A1* | 11/2016 | Axelson | A63B 21/4013 |
| 2017/0106223 A1 | 4/2017 | Brancato et al. | |
| 2021/0252326 A1* | 8/2021 | Brancato | A63B 21/4009 |

* cited by examiner

ADJUSTABLE EXERCISE DEVICE

RELATED APPLICATIONS

This application is a National Phase of PCT Patent Application No. PCT/IL2018/050686 having International filing date of 21 Jun. 2018, which claims the benefit of priority of U.S. Provisional Patent Application No. 62/523,278 filed on 22 Jun. 2017. The contents of the above applications are all incorporated herein by reference.

FIELD AND BACKGROUND OF THE INVENTION

The present invention relates to sliding clips and more particularly but not exclusively to an exercise device in which sliding clips secure bungees at adjustable locations along a strap.

It is known to perform various exercises with elastic straps ("bungees") attached to a belt around the user's waist. In some exercises, the straps need to be anchored at the back, and muscles are exerted by pushing the hands against the elastic straps either forwards or upwards. In other devices, straps are attached at the front and connected to the feet so as to help in lifting the feet during rehabilitation exercises for walking. Straps anchored at the sides may be used for shoulder exercises. Generally, for any given device, bungees are attached at a fixed position on the belt.

SUMMARY OF THE INVENTION

According to an aspect of some embodiments of the invention, there is provided a clip including: a connector for slidably connecting the clip to a textile strap; a fastener for reversibly attaching and detaching an object to the clip a closure for the fastener having a closed position wherein the object is prevented from detaching from the fastener and an open position wherein the object can be detached from the fastener and a retainer for retaining the closure to the clip in the open position.

According to some embodiments of the invention, the fastener includes a channels sized and shaped to hold at least two bungees.

According to some embodiments of the invention, the closure is configured to fix a position of the at least two bungees in the channel.

According to some embodiments of the invention, the closure includes a knob and a screw thread for screwing to the channel by rotating with respect to the channel.

According to some embodiments of the invention, the retainer includes a flexible strip rotatably connecting the closure to the channel.

According to some embodiments of the invention, the clip further includes a belt for holding the strap around a waist of a person and wherein the flexible strip is positioned below the channel such that when the belt is worn upright the strip underlies the channel and catches the bungees when they fall out of the channel.

According to some embodiments of the invention, the retainer retains the closure within 5 cm of the channel in the open position.

According to an aspect of some embodiments of the invention, there is provided an exercise device including: a belt including a strap; and a clip including a connector for slidably connecting the clip to the strap and a fastener for reversibly attaching and detaching a elastic tension element to the clip.

According to some embodiments of the invention, the exercise device further includes: a closure for the fastener having a closed position wherein the elastic tension element is prevented from detaching from the fastener and an open position wherein the elastic tension element can be detached from the fastener and a retainer for retaining the closure to the clip in the open position.

According to some embodiments of the invention, the fastener includes a channels sized and shaped to hold at least two bungees.

According to some embodiments of the invention, the fastener includes a closure configured to fix a position of at least two bungees in the channel and wherein the tension element includes at least one of the at least two bungees.

According to some embodiments of the invention, the device further includes: a second clip moving slideably attached to the strap and reversibly attached to at least two more elastic tension elements length of elastic tension elements.

According to some embodiments of the invention, the closure includes a knob and a screw thread for screwing to the channel.

According to some embodiments of the invention, the device further includes a clamping jaw rotationally fixed with respect to the channel and sliding axially within the channel wherein the knob is joined to the clamping jaw to move axially with the clamping jaw and the knob rotates with respect to the clamping jaw.

According to some embodiments of the invention, the knob includes a fully tightened position wherein the at least two bungees are prevented from moving with respect to the channel, a loose position in which the at least two bungees can move longitudinally with respect to the channel but cannot be detached from the channel and an open position in which the at least two bungees can be detached from the channel.

According to some embodiments of the invention, the retainer includes a flexible strip rotatably connecting the closure to the channel.

According to some embodiments of the invention, the device further includes a belt for holding the strap around a waist of a person and wherein the flexible strip is positioned below the channel such that when the belt is worn upright the strip underlies the channel and catches the at least two bungees when they falls out of the channel.

According to some embodiments of the invention, the retainer retains the closure within 5 cm of the channel in the open position.

According to an aspect of some embodiments of the invention, there is provided a method of exercising by a user including: wrapping an exercise belt around a waist of the user; and moving a first limb of the user while applying a resistance to the first limb by means of a first elastic element attached to a clip in a first position on the belt; and moving the clip to a second position on the belt and performing a second exercise.

According to some embodiments of the invention, the method further compromising: attaching a second elastic element to the clip and simultaneously moving the first limb and a second limb of the user while applying a resistance to the first limb by means of the first elastic element attached to the clip in the first position and while applying a resistance to the second limb by means of the second elastic element attached to the clip in the first position.

According to some embodiments of the invention, the belt includes at least a second clip and at least a third elastic element and a fourth elastic element, the third elastic element and the fourth elastic element attached to the second clip the method further including: moving a third limb and a fourth limb of the user simultaneously to the moving the first limb and the second limb, while applying a resistance to the third limb by means of the third elastic element and while applying a resistance to the forth limb by means of the forth elastic element.

According to some embodiments of the invention, the method further includes independently adjusting a length of the first elastic element and the second elastic element and the third elastic element.

According to some embodiments of the invention, the method further includes independently adjusting a respective length of each of the first elastic element and the second elastic element and the third elastic element and the fourth elastic element.

According to some embodiments of the invention, the method further includes independently adjusting an respective elasticity of each of the first elastic element and the second elastic element and the third elastic element and the fourth elastic element.

According to some embodiments of the invention, the method further includes: replacing the first elastic element with a second elastic element while the belt remains on the waist.

According to some embodiments of the invention, the replacing is with one hand of the user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF THE PREFERRED EMBODIMENTS

Figure 1A:
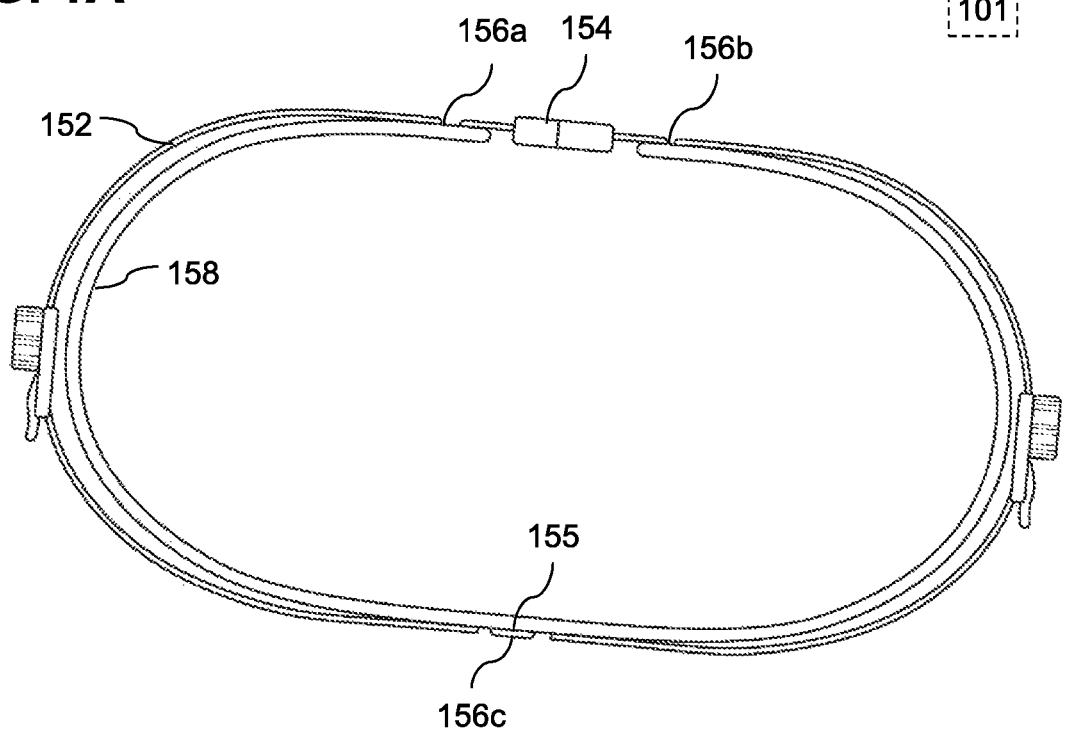
FIG. 1 is an overhead view of a belt with two clips in accordance with an embodiment of the present invention.

The present invention is an exercise device in which sliding clips secure one or more cords (for example a bungee) and/or posts and/or clasps at adjustable locations along a strap. Optionally the anchoring position may be adjusted (for example by sliding the clip along the strap) and/or of the free length of the cord may be adjusted by changing the position of the cord in a clamp.

The principles and operation of exercise devices and corresponding clips according to the present invention may be better understood with reference to the drawings and the accompanying description.

An aspect of some embodiments of the present invention relates to displaceable clips which can be moved along an anchoring strap. In some embodiments, the clips can then be locked into position on the anchoring strap. Optionally each clip includes a clamp for holding cords and/or equipment.

In some embodiments an anchoring strap may extend around a belt. For example, clips on such a strap may be used to hold exercise equipment and/or tools and/or other equipment such as lights and/or cameras for photography. Alternatively or additionally, an anchoring strap may be mounted on a building and/or a piece of furniture, for example wrapped around a pillar and/or along a wall. For example, straps on a building may hold a sign and/or a light. For example, a strap on a desk may hold a lamp and/or a computer display and/or a telephone that can be repositioned according to need. Alternatively or additionally, a strap may be mounted to a vehicle. For example, clips on a strap inside a passenger vehicle may be used for holding luggage and/or food containers and/or entertainment devices. For example, a strap on the outside of a vehicle may be clips for mounting a luggage rack and/or a bicycle rack and/or another object. For example, inside a truck a plane or a boat, a strap may have movable connection clips that are used to immobilize cargo.

An aspect of some embodiments of the current invention relates to an exercise belt. In some embodiments, an anchoring strap extends around the belt and/or exercise equipment is held on one or more sliding clips. For example, there may be two sliding clips, each free to move along a strap which extends around at least 90 degrees, and more preferably at least 150 degrees, and typically approaching 180 degrees, around the belt when deployed. The two clips are preferably deployable by the user, one on the left and one on the right, from a position in front of the user, around to positions near the hips, and/or to positions near the center of the user's back. Optionally, at any position along the strap, operating a lever locks the clip in its current position on the strap. By adjusting the position of the clips along the strap, and/or by adjusting the free length of the bungees extending from the clips, a user may adjust the exemplary system for performing a wide range of exercises and/or therapies. Alternatively, a belt with movable clips may be used for holding tools and/or for supporting equipment (for example a camera and/or lights for photography).

In some embodiments, each adjustable clip carries an adjustable clamp. For example, the clamp may be configured for releasably clamping one or more bungees. The clamp optionally allows adjusting of the free length of the bungee that is in use.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIGS. 1A-3B illustrate a waist belt system 101 configured to hold slidable clips in accordance with some embodiments of the present invention. Optionally, the belt system 101 holds displaceable clips 110 for clamping a bungee. FIGS. 4A-7B illustrate the structure of an embodiment of a displaceable clip. For example, the clip of FIGS. 4A-7B may be used with the belt system 101 of FIGS. 1A-3B. FIGS. 8A-10B illustrate various modes of use of an exercise device in accordance with an embodiment of the present invention. These different aspects will now be addressed separately.

Belt-Based Implementation

FIGS. 1A-3B illustrate a waist belt system 101 configured to hold slidable clips in accordance with some embodiments of the present invention. Optionally, the belt system 101 holds displaceable clips 110 for clamping a bungee.

It is a particular feature of certain particularly implementations of the present invention that displaceable clips 110 are mounted on a flexible strap 152, typically formed from a webbing "tape" or strip. Suitable webbing tape may be formed from a wide range of suitable materials, for example polymer materials such as nylon, polyester or polypropylene. In some embodiments, a webbing tape strap, optionally without any predefined apertures or other locking features, effectively provides a "rail" along which the displaceable clips 110 can be moved to provide continuous adjustability over an extended range of positions of the displaceable clips 110. Optionally the clips 110 may be locked wherever needed, thereby providing a user-customized experience. At the same time, the use of flexible straps 152 facilitates the device conforming to the size and body contours of the individual user, and/or facilitates user comfort, even when sitting against a backrest or lying on the floor.

In some embodiments, the strap 152 may be loaded with considerable lateral forces during use. Typically, tension of the strap 152 will inhibit sagging or twisting of the strap 152 due to the load. Optionally, the straps 152 are stretched across the surface of a padded belt 158, which may be similar to a regular exercise belt or back-support belt. For example the belt 158 may have a width that is greater than the width of the straps 152, typically at least 50% greater, and/or between 50 to 200% the width of the strap 152 and/or in many cases, at least about twice the width of the straps 152. For example, widths of the straps 152 are typically in the range of 1-6 cm, and most preferably 2-5 cm, while widths of the belt 158 are typically in the range of 5-15 cm around most of its circumference.

The straps 152 are preferably not significantly stretchable, and extend around the outside of the belt 158 with a length between fastening points 156a, 156b, 156c that facilitate holding the strap taught around the belt 158 when the belt system 101 is fastened around the curvature of the user's body. The belt system 101 is preferably closed around the user by an interlocking clasp 154 (interchangeably referred to as a "buckle"), which may include any suitable clasp, preferably associated with adjustable straps, allowing adjustment of the belt system 101 to fit users of a range of different waist sizes. The belt 158 is optionally designed with a region of overlap, where the clasps overlie, and/or are adjacent to, the region of overlap.

Securing of the straps 152 to the belt 158 is typically achieved at securing points, for example 156a-156c. Optionally, at securing points 156a-156c the strap 152 is secured to the belt 158 via areas of stitching, which may be implemented with various reinforced stitching patterns such as those used in load-bearing applications. For example, strap 152 may be a continuous and/or have two ends attached to buckle 154 to form a loop. Strap securing points 156a, 156b are optionally adjacent to and on opposite sides of the buckle 154, which is typically positioned at the front of the body of a wearer, securing point 156c is located near a midpoint 155 of the belt 158, which is typically positioned at the back of the body during use. Alternatively or additionally, the strap may be secured to the belt at various points not necessarily symmetrically distributed. Alternatively or additionally, a strap may be connected continuously to the belt and the clip may be configured to pass over the securing points (for example there may be a slit in a base 412 of the clip that straddles the securing points). For example, midpoint 155 may divide strap 152 into right and left portions. Optionally, both the right portion and the left portion may be implemented using a single strap 152 extending along substantially the entire length of the belt 158 and secured near its ends and near its midpoint to the belt 158. Optionally, strap 152 may be folded and/or doubled over at some or all of the securing points 156a-156c.

Figure 1B:
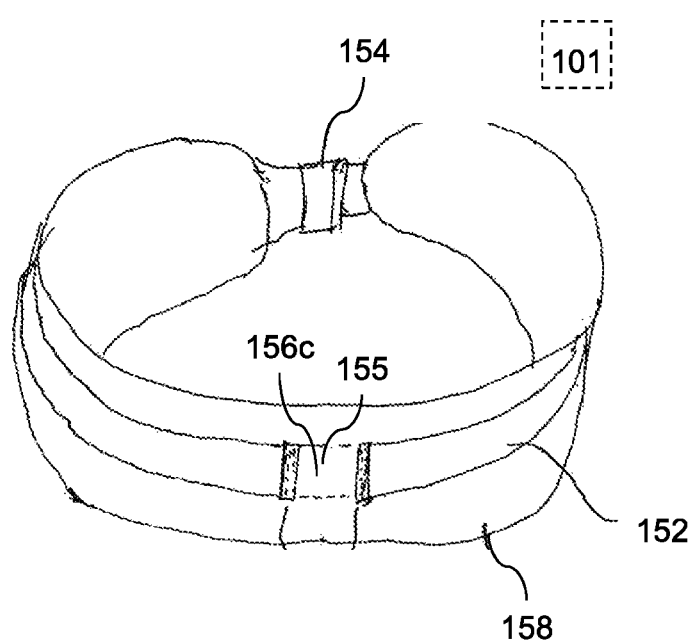
Figure 2A:
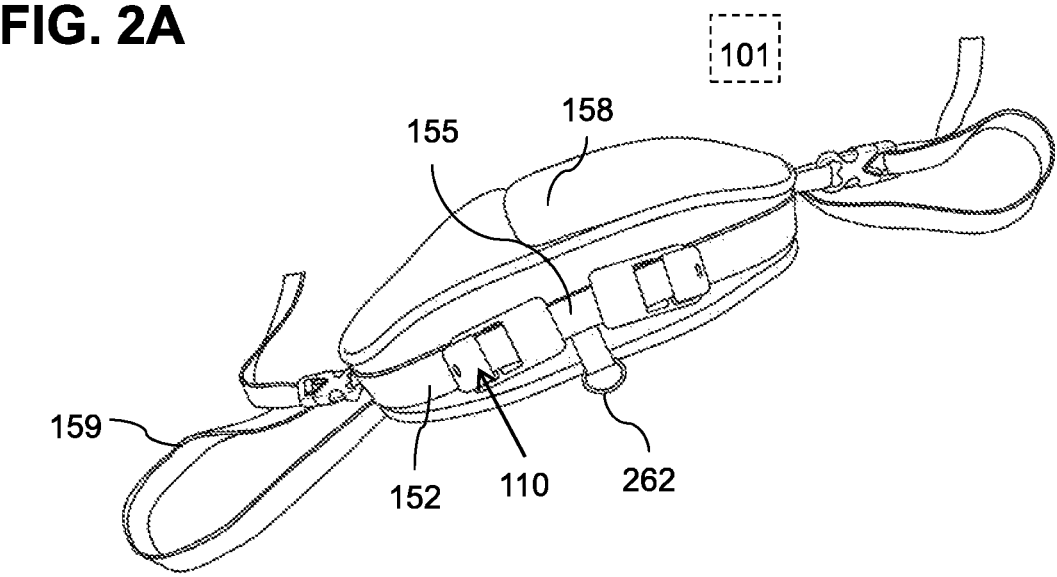
FIG. 2A is a perspective rear view of a closed belt for holding clips in accordance with an embodiment of the present invention.
Figure 2B:
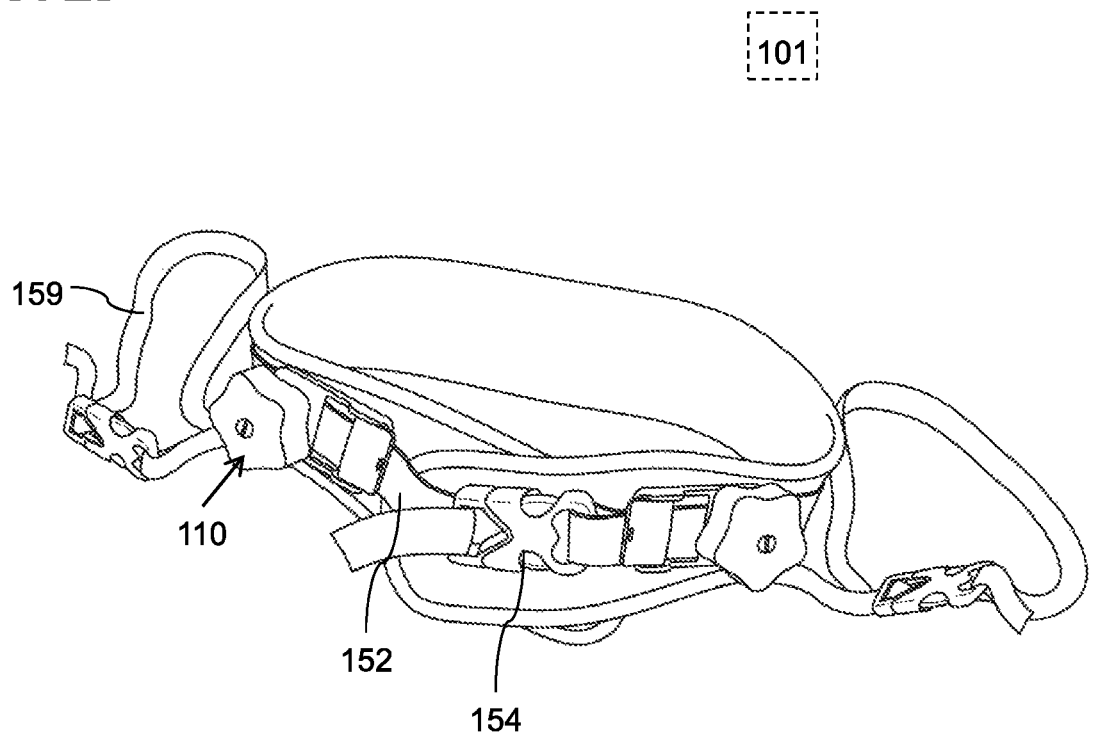
FIG. 2B is a perspective front view of a closed belt with two clips in accordance with an embodiment of the present invention.
Figure 3A:
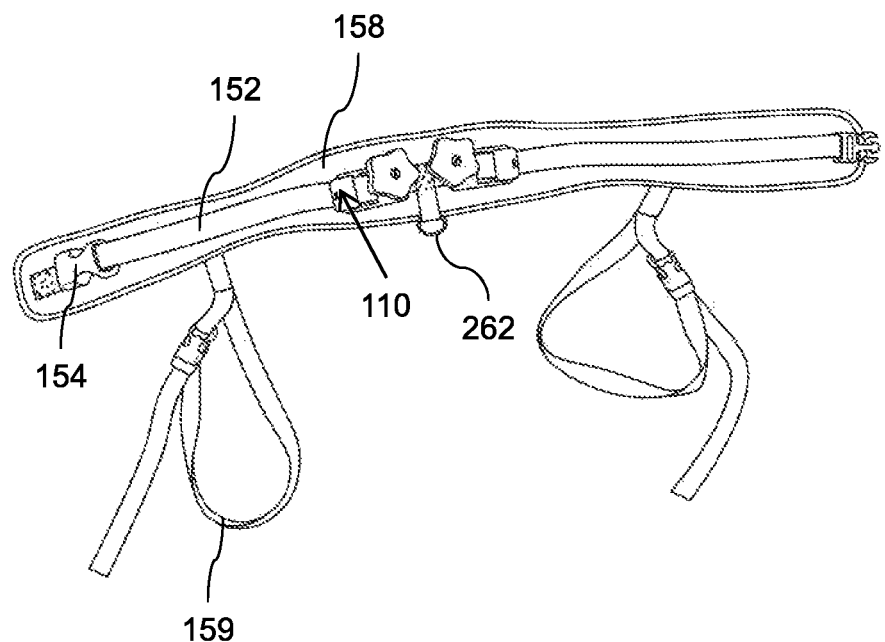
FIG. 3A is a perspective view of an open belt with two clips in a rear position in accordance with an embodiment of the present invention.
Figure 3B:
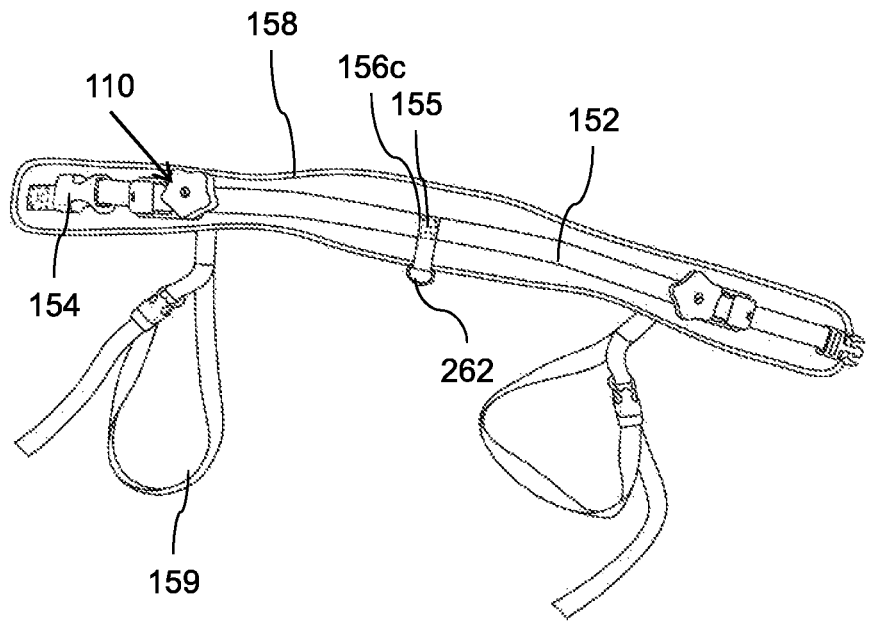
FIG. 3B is a perspective view of an open belt with two clips in a front position in accordance with an embodiment of the present invention.
Figure 3C:
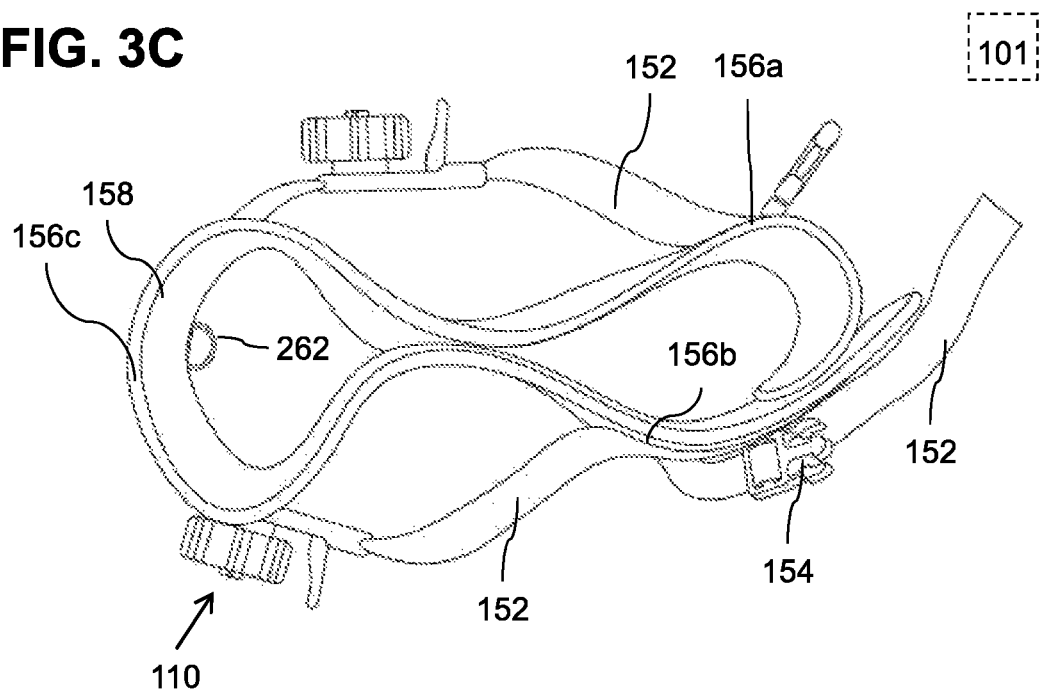
FIG. 3C is a perspective overhead view of a closed belt with two clips in accordance with an embodiment of the present invention.

In some embodiments, clips 110 may be positioned and/or repositioned freely according to the needs of a user. Examples of exercises using clips at various positions are illustrated for example in FIGS. 8A to 10B. For example, FIG. 1A illustrates a top view of a bucked belt system 101 with clips 110 located laterally on the belt system 101 for positioning on opposite sides of a user. For example, one or more bungees may be secured in each clip. Ends of some or all of the clips may be attached to one or more limbs of a user. For example this may supply resistance to movement for various exercises in various directions. The resistance may be adjusted, for example, but adjusting the position of the bungee in the clip (e.g. the length of the bungee between the clip and the limb) and/or by positioning a bungee with a higher or lower elasticity. For example, the configuration of FIG. 1A may be useful for a worker for holding tools and/or tool bags at an easily accessible position while working. For example, FIGS. 2A and 3A illustrate buckled and open belt system 101 with clips 110 located near the middle line of the belt system 101 for positioning on the back of a user. For example, the configuration of FIGS. 1A and 3A may be useful for a worker holding tools and/or tool bags out of the way when he is not currently using them. For example, FIGS. 2B and 3B illustrate buckled and open belt system 101 with clips 110 located near the buckle of the belt system 101 for positioning on the front of a user. For example, the configuration of FIGS. 2B and 3B may be useful for helper of a photographer holding poles for lights. Alternatively or additionally, a belt system 101 may include only on clip and/or more than two clips. In some embodiments, a clip on one side of the belt system 101 may be positioned in a different location from a clip on another side. In some embodiments, the belt system 101 itself may not be symmetric and/or the buckle may not be in the front. Optionally, there may no securing points one securing point and/or more than three securing points. FIG. 1B illustrates a rear view of an embodiment of a belt system 101 without clips attached.

In some embodiments a belt system may include optional stabilizers. For example, a belt system 101 may include leg straps 159. For example, leg straps 159 may prevent the belt system 101 from riding up when it is pulled upwards. Alternatively or additionally a belt system may include suspenders to prevent the belt system from being pulled down. Alternatively or additionally, a ring 262 may be provided. For example ring 262 may be used to hang belt system 101 for storage (for example on a peg). Alternatively or additionally, ring 262 may be used to hook an exercise system to an immobile object so that the elastic tension elements can be used as a static exercise machine. Alternatively or additionally, an elastic element can be used to connect belt system 101 to a moving and/or immobile object for exercise that involves resistance to movement.

In some embodiments, two displaceable clips 110 may be located on each of the right and left portions straps. The clips may optionally be secured at arbitrary locations along each strap. For example, in an exercise machine clips may provide adjustable clamping or one or more bungee cord, to allow anchoring of bungee cords of appropriate length and in appropriate positions for a range of exercises and/or therapies. One particularly preferred implementation of a displaceable clip for this purpose will now be described with reference to FIGS. 4A-7B.

Displaceable Clip Implementation

FIGS. 4A-7B show an exemplary implementation of a displaceable clip 410. Clip 410 may be include for example a fastener for anchoring various, objects for example a clamp. In some embodiments a clamp may be configured for holding rope, posts, cords etc. Optionally clip 410 is configured to ride along a track, for example a textile belt. Optionally a position of an object in clamp 410 is adjustable, for example, for positioning one or more bungee cords 664a, 664b, at a desired location along the straps 152.

Figure 3D:
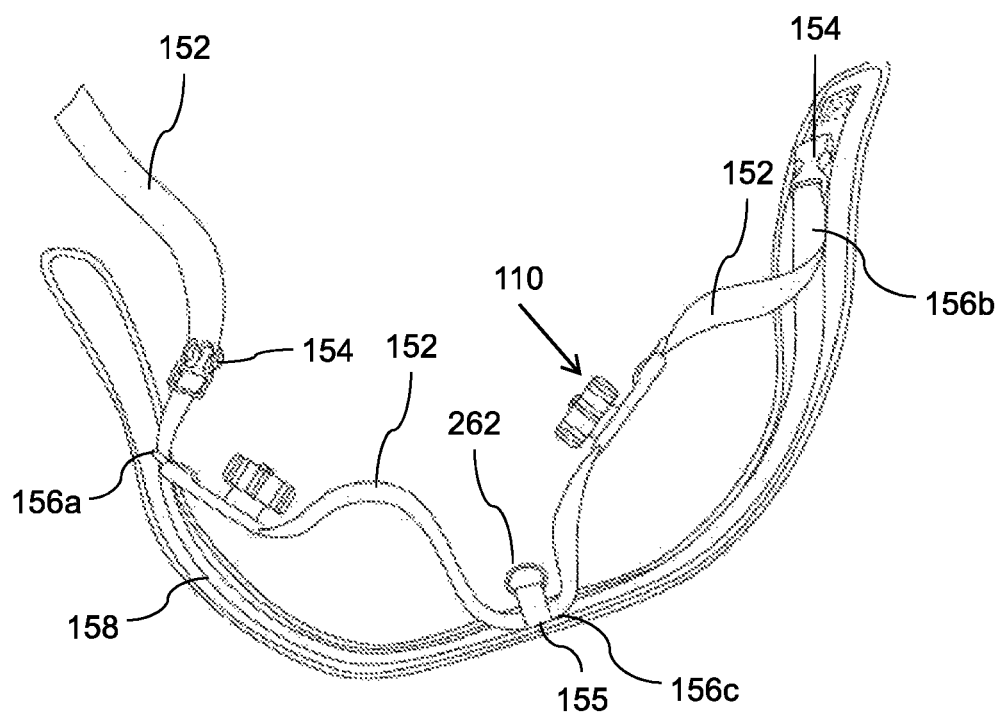
FIG. 3D is a perspective overhead view of an open belt with two clips in accordance with an embodiment of the present invention.
Figure 4A:
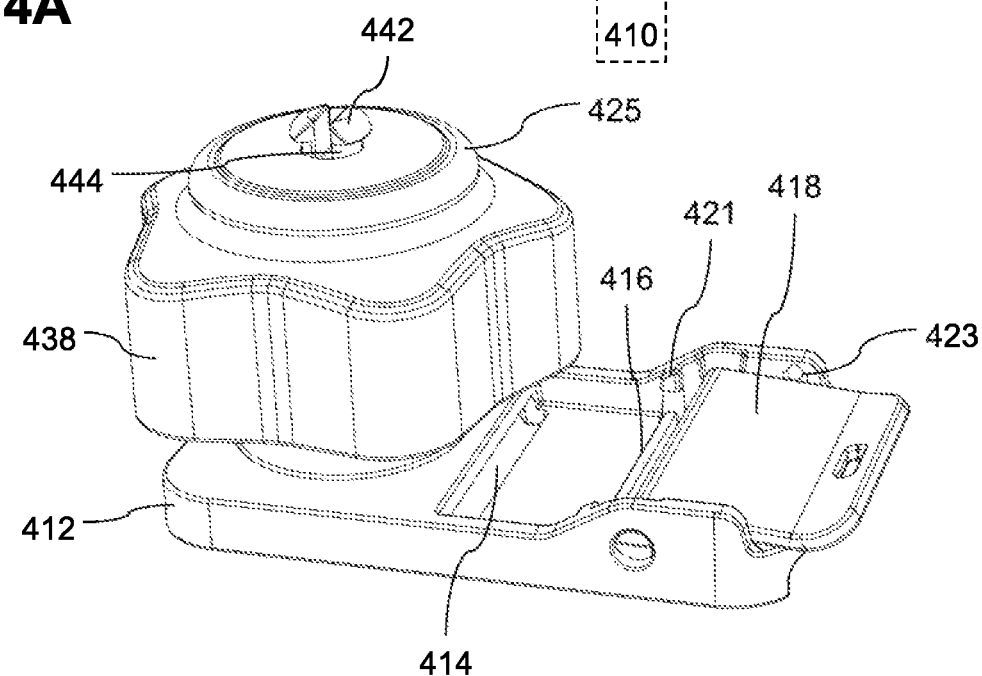
FIG. 4A is a perspective view of an assembled clip in accordance with an embodiment of the present invention.
Figure 4B:
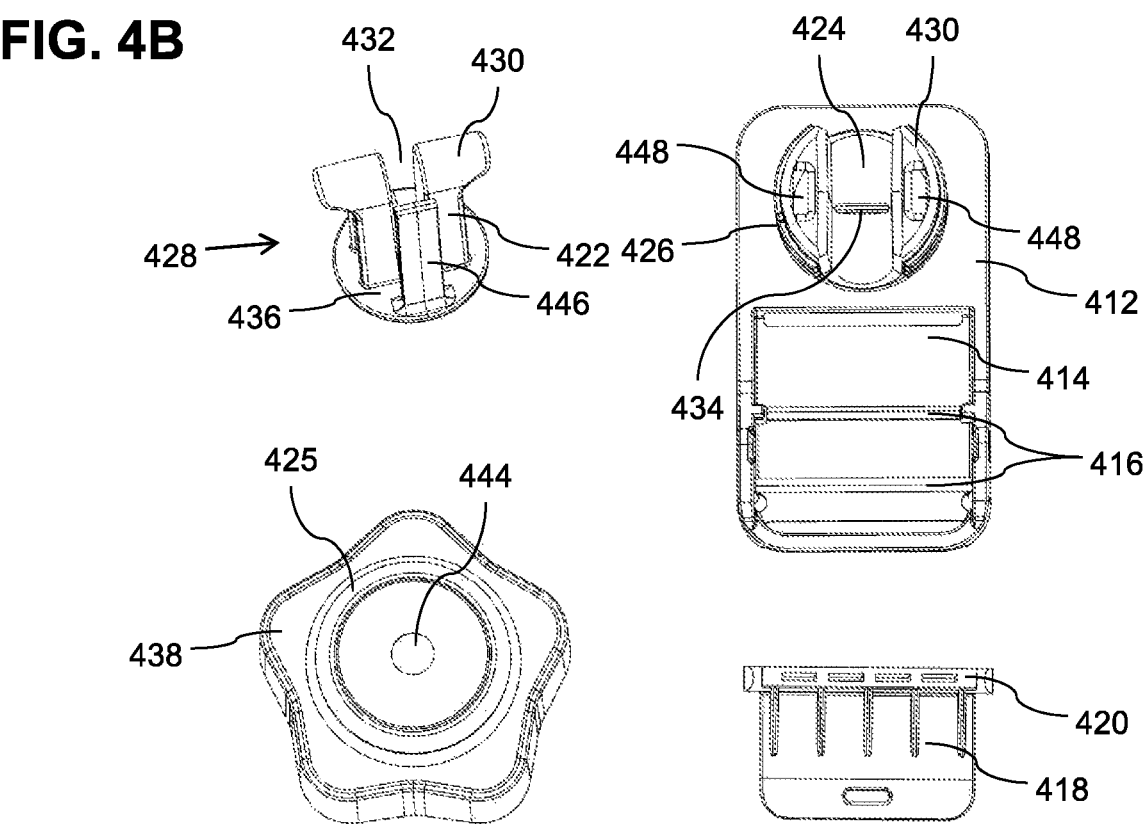
FIG. 4B is a perspective view of a disassembled clip in accordance with an embodiment of the present invention.
Figure 4C:
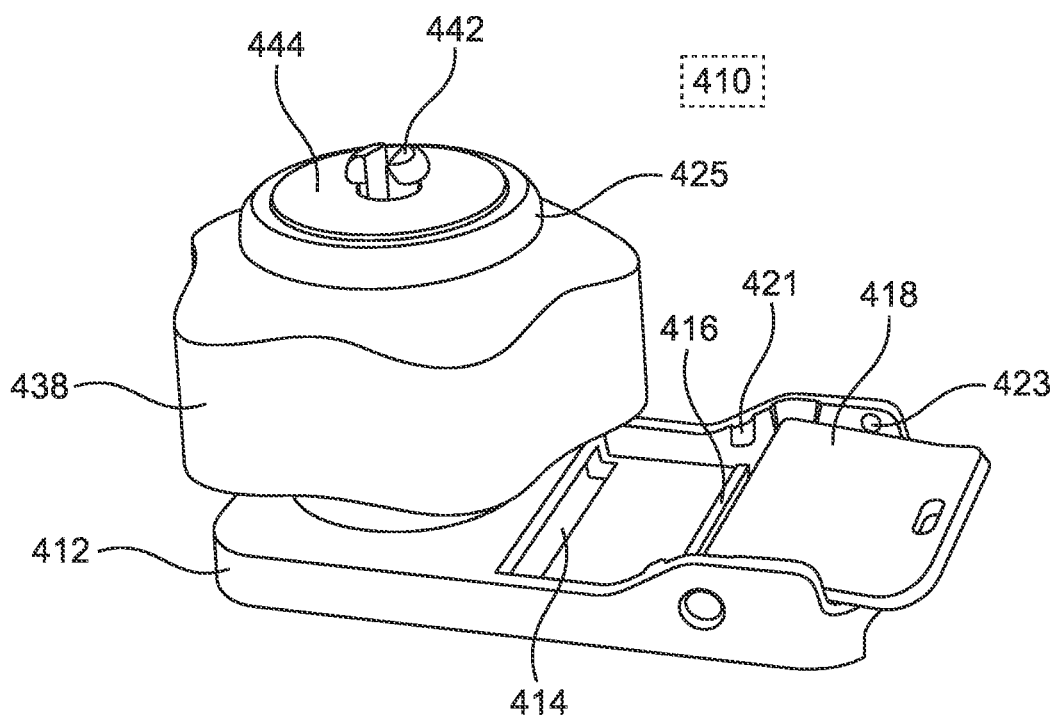
FIG. 4C is a perspective grayscale view of an assembled clip in accordance with an embodiment of the present invention.
Figure 4D:
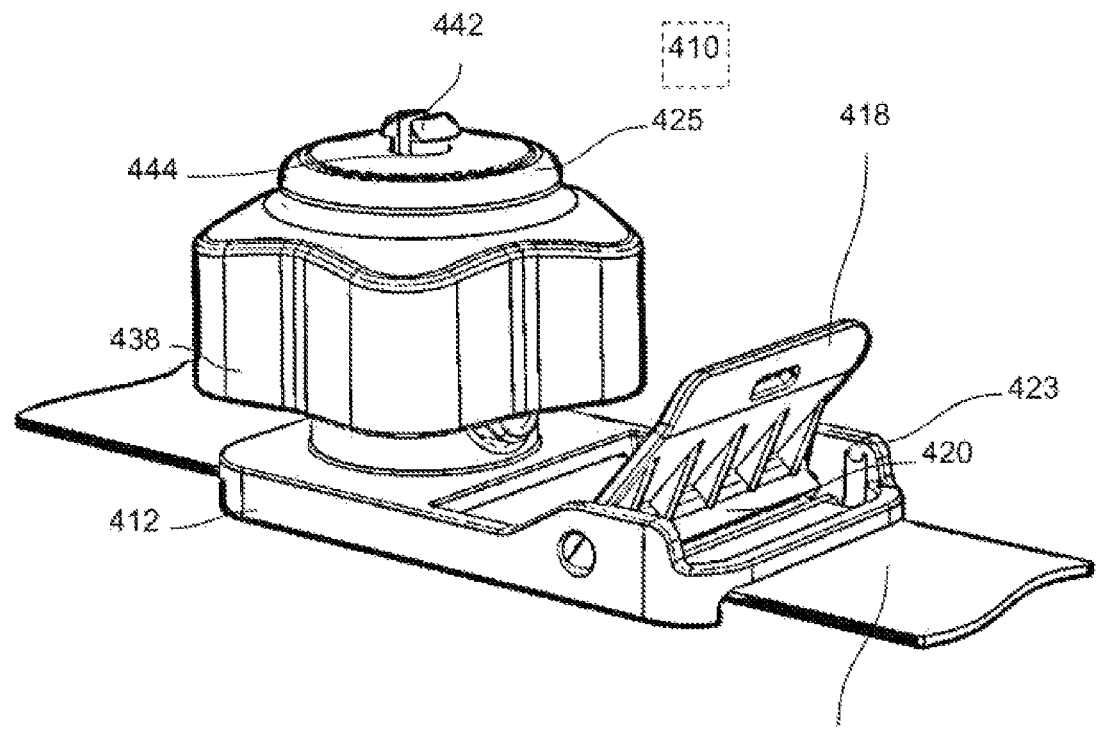
FIG. 4D is a perspective view of an assembled clip connected to strap in accordance with an embodiment of the present invention.
Figure 5A:
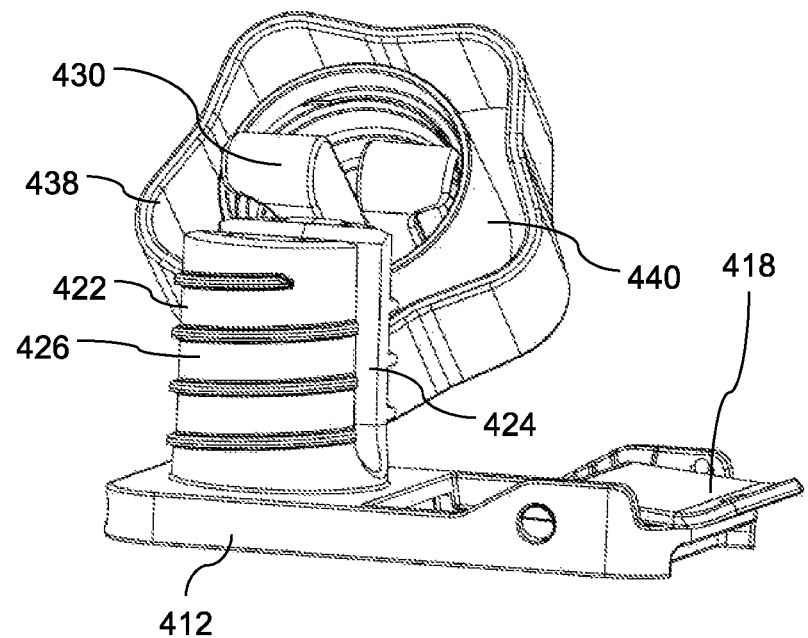
FIG. 5A is a perspective view of an assembled clip with an open fastener in accordance with an embodiment of the present invention.
Figure 5B:
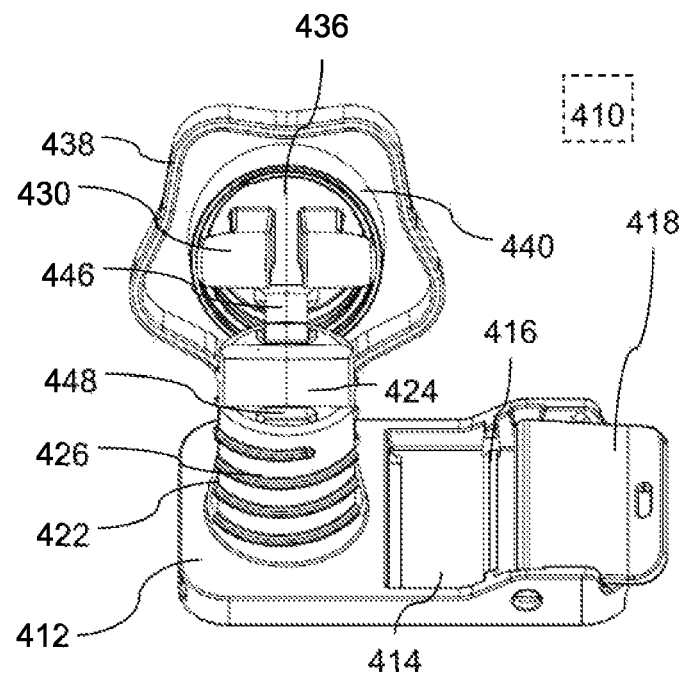
FIG. 5B is a perspective overhead view of an assembled clip with an open fastener in accordance with an embodiment of the present invention.
Figure 6A:
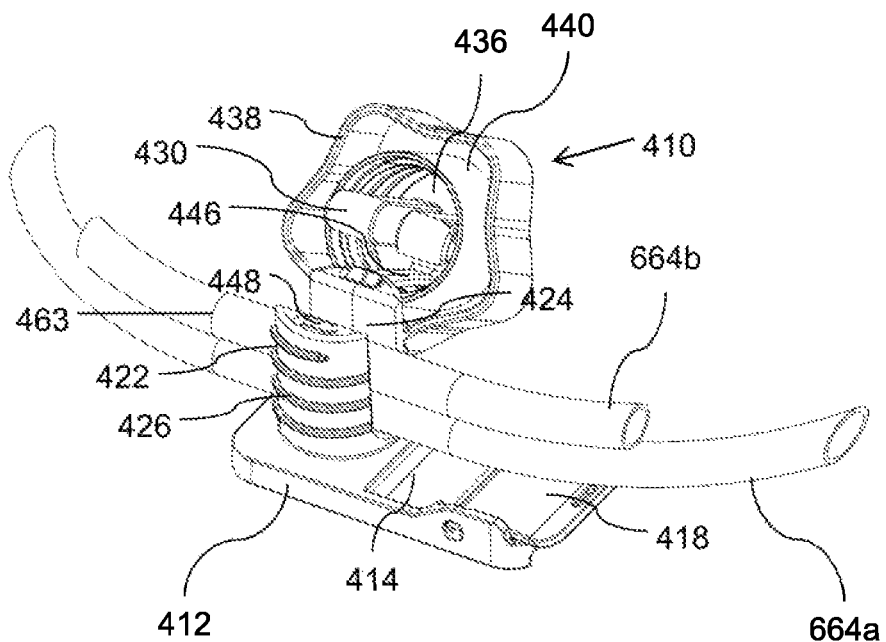
FIG. 6A is a perspective view of an assembled clip with two bungees in an open fastener and a rotational knob disassembled from a clamping jaw in accordance with an embodiment of the present invention.
Figure 6B:
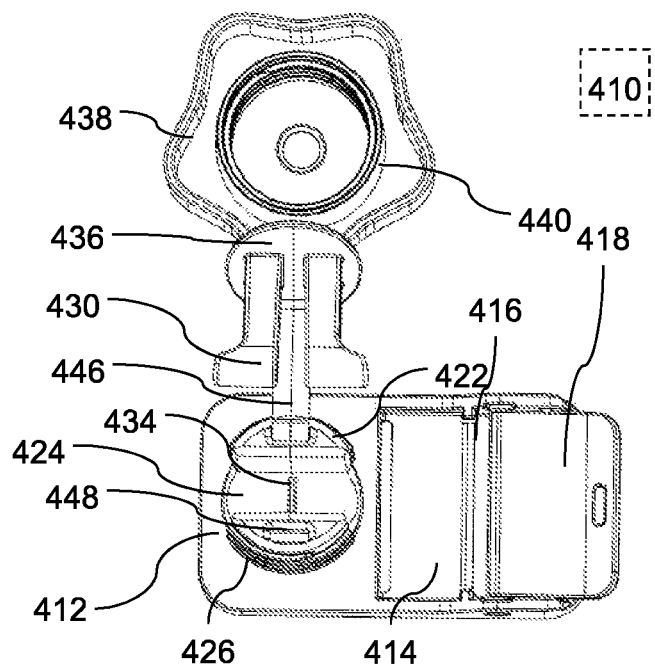
FIG. 6B is a perspective overhead view of an assembled clip with an open fastener in accordance with an embodiment of the present invention.
Figure 7A:
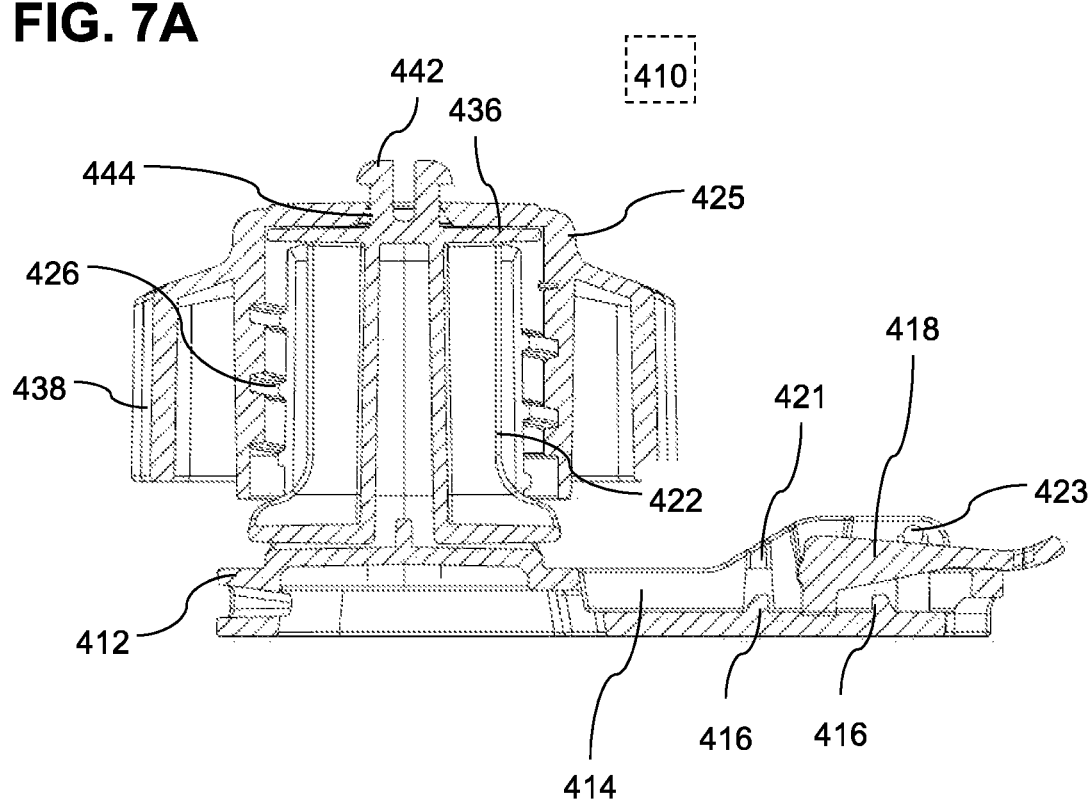
FIG. 7A is a cross sectional view of an assembled clip with a closed fastener in accordance with an embodiment of the present invention.
Figure 7B:
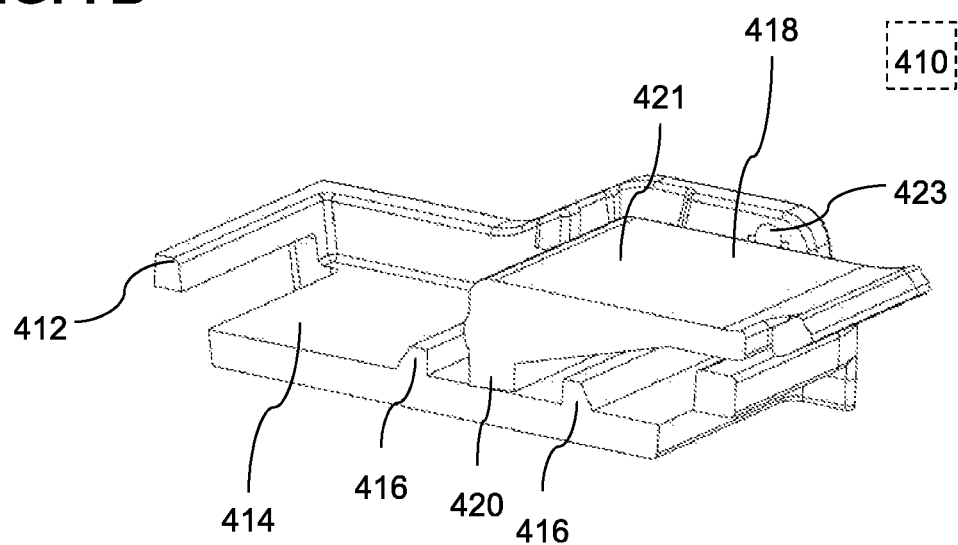
FIG. 7B is a cross sectional view of connector for a strap in accordance with an embodiment of the present invention.
Figure 7C:
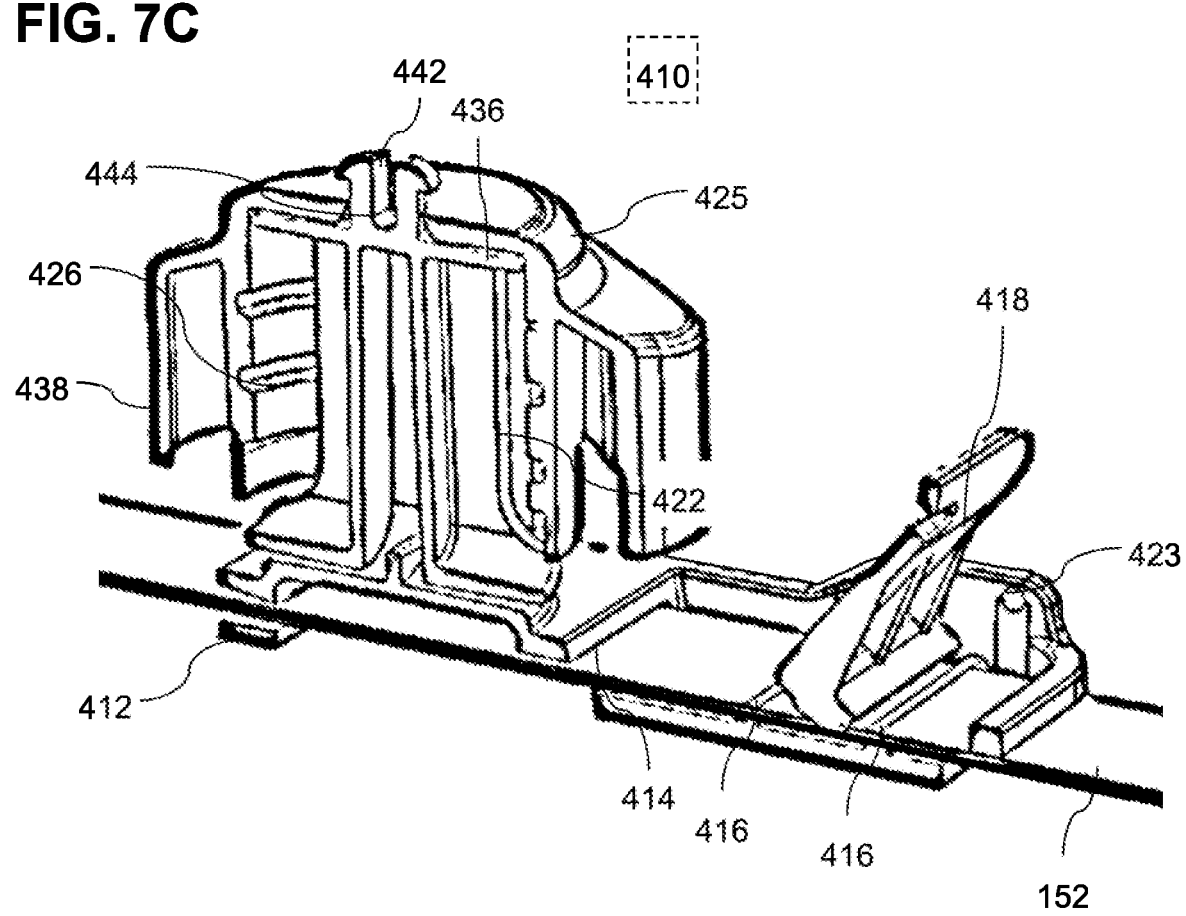
FIG. 7C is a cross sectional view of a strap connected to an assembled clip with a closed fastener in accordance with an embodiment of the present invention.

In some embodiments, a clip will include a connector for slideably connected the clip to a track and/or a strap. For example, each clip 410 includes a base 412 which is formed with a throughway 414 along which a strap 152 passes. As best seen in the cross-sectional views of FIGS. 7A and 7B, base 412 is optionally formed with ridges 416 projecting into throughway 414. In some embodiments, clip 410 includes a locking element 418. For example, locking element 418 is hingedly engaged with base 412 so as to form a manually actuated flap. Locking element 418 is optionally formed with a laterally projecting locking edge 420 which, when locking element 418 is depressed to its locking position as shown in FIGS. 3D and 4A, presses against a strap passing along throughway 414 so as to bear on the strap between ridges 416, thereby pinching the strap between the ridges and locking clip 410 relative to the strap. When the flap of locking element 418 is manually lifted (as in for example in FIGS. 6B and 3C), locking edge 420 is lifted away from ridges 416, thereby releasing the pinching effect on the strap and allowing repositioning of the clip along the strap. The extent of lifting of the flap 418 is preferably limited, for example by a rear step 421 formed in base 412. Optionally, limiting movement of flap 418 prevents locking element 418 from interfering with the bungee cord clamping mechanism (for example an exemplary clamping mechanism as described below). Additionally or alternatively, small projections 423 optionally act as detents, providing positive engagement of locking element 418 in its locked state. Alternatively or additional, other locking mechanisms may be provided within the current invention. For example, a locking mechanism may include a tongue buckle and/or an autogrip type buckle and/or an autolock mechanism (e.g. with a ratchet) and other mechanisms for locking to a belt and/or a strap.

A further set of optional features of clip 410 relate to adjustable clamping of one or more bungee cords 664a, 664b. Alternatively or additionally, a clip may include a mount for a pole and/or hook for a bag and/or a specialized hanger for a tool (for example a chain saw). In the preferred implementation illustrated here, a clamping column 422 is integrally formed with base 412. Clamping column 422 optionally includes a central channel 424 for receiving one or more bungee cords 664a, 664b and/or an externally-threaded cylindrical outer surface 426.

In some embodiments, a closure element, for example a clamping jaw 428 fits to channel 424. For example, jaw 428 fits slidingly longitudinally within central channel 424 so as to bear on a bungee cord 664a, 664b disposed therein. Optionally the shape of channel 424 and/or clamping jaw 428 rotationally fix jaw 428 with respect to channel 424 and/or prevent rotation of clamping jaw 428 with respect to channel 424. Clamping jaw 428 is optionally formed with a rounded clamping surface 430, for example without corners that may cause damage to a cord clamped thereby. In some embodiments, clamping surface 430 is subdivided into two by a central slot 432. A gripping surface may be supplied enhancing gripping of the bungee cord 664a, 664b. For example, a lateral ridge 434 passes across central channel 424 so as to be in opposing relation to central slot 432. Clamping jaw includes an optional interface for a tightening element. For example, a top of clamping jaw 428, here illustrated as a disk 436, is sized and shaped to be received within a recess of a tightening knob 438. For example, disk 436 is rotatably attached to knob 438 such that knob 438 can rotate with respect to clamping jaw 428. Optionally the attachment is such that clamping jaw 428 moves longitudinally with knob 438.

In some embodiments when the closure element (e.g. Jaw 428) is inserted into channel 424, a cord (for example a bungee) can't be slid into our out of the channel. Optionally, when the closure element is tightened it immobilizes a cord in the channel. Alternatively or additionally, when a cord is inserted loose into the channel it prevents detachment of a cord, but allows the cord to move within the channel (for example lengthening and/or shortening a free portion of the cord). Alternatively or additionally, when the closure element is separated from the channel, a cord may be detached from the clip.

Optionally, the closures element includes a tightening element (e.g. a knob 438) bearing down on a piston element (e.g. clamping jaw 428) to clamp a cord (e.g. a bungee) inside a channel (e.g. channel 424). For example knob 438 has an internally-threaded skirt 440 for engaging the external thread of cylindrical outer surface 426. In the exemplary embodiment, when a bungee cord 664a, 664b is deployed in central slot 432, clamping jaw 428 is positioned on top of the bungee cord 664a, 664b, and skirt 440 is engaged with the thread of cylindrical outer surface 426, rotation of knob 438 causes the knob to bear against the top of clamping jaw 428, thereby squeezing the bungee cord 664a, 664b between clamping surface 430 and the base of central channel 424, thus securing the bungee cord 664a, 664b. Optionally, when knob 438 rotates around an axis of channel 424, engagement between screw threads on the knob 438 and column 422 causes knob to move longitudinally parallel to the axes of channel 424. Longitudinal movement of knob 438 optionally forces jaw 428 to move longitudinal along channel 424. In some embodiments, the free length of the bungee cord 664a, 664b can be adjusted. For example, knob 438 is rotated anticlockwise sufficiently to release the clamping pressure of jaw 428 on the cord, and the cord can then be adjusted before the knob is re-tightened. In some embodiments, a cord 664a, 664b may be removed and/or replaced. For example, knob 438 is further loosened until it can be lifted, together with clamping jaw 428 out of central slot 432, thereby leaving the slot open and accessible for removal and/or insertion of a cord 664a, 664b. Optionally, knob 438 may include a raised portion 425. For example, raised portion allows knob 438 to be used over a longer column 422. Optionally disk 436 fits into raised portion 425. Optionally, a cord 664a, 664b will include a marking 463. For example, the marking may facilitate positioning the cord 664a, 664b in a desired position and/or returning the cord 664a, 664b to a predetermined position.

In some embodiments, the various components of clip 410 are interconnected such that, when the clamp is opened for insertion or removal of a cord, the parts do not fully separate, and/or cannot be dropped. This may keep them readily available for closing. In the example shown here, the top of clamping jaw 428 is formed with a barbed resilient projection 442 which loosely engages a central opening 444 in knob 438 so as to still allow relative rotation of the knob relative to the clamping jaw 428. Clamping jaw 428 is optionally formed with a flexible retaining strip 446 which connects it to base 412. For example, strip 446 includes a barbed tip which engages a corresponding slot 448 in the top of clamping column 422. Optionally, the tip remains attached to column 422 for example, as illustrated for example in FIGS. 6A and 8D, when the clamp is fully opened. Optionally, the clamp can be fully opened for insertion or removal of a bungee cord during use and/or with one hand. Optionally, while the cover is open, the elements all remain interconnected and/or properly positioned and/or ready for use to re-clamp and/or hold a cord. For example, the parts remain in position for reclosing the channel 424 with one hand and/or without looking.

In some embodiments, the clamp is designed to work on either a right or left side of a belt. For example, both sides of the top of clamping column 422 are provided with slots 448. Optionally, the clip may be assembled on both the right side with the flexible retaining strip 446 below the central channel 424. For example, if the cord falls out of channel 424 while the cover is open, the cord may be supported on strip 446. This may inhibit the bungee cord from falling away from the clip if it falls out from the central channel when the device is opened. Keeping the cord and cover close to channel 424 optionally facilitates one-handed operation of the clip, for example as explained below with respect to FIGS. 8C and/or 8D.

Modes of Use

Figure 8A:
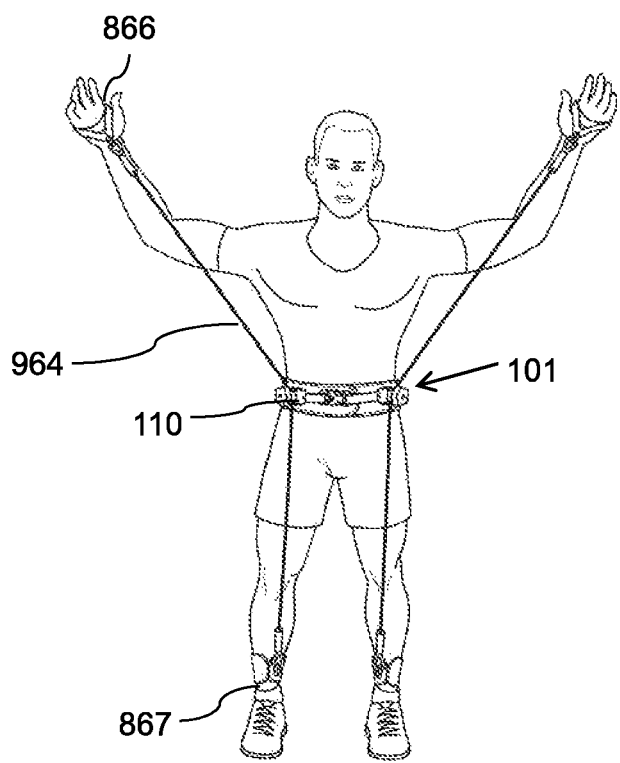
FIG. 8A is a perspective view person standing and exercising with clips in a forward position in accordance with an embodiment of the present invention.

Various different modes of use of an exercise device in accordance with an embodiment of the present invention are illustrated in FIGS. 8A-10B. In the cases of FIGS. 8A and 10A, the device is shown with clips 110 deployed in a lateral forward position, just in front of the user's hips. This with the clips in this position, the device may be used for a range of exercises, for example of the arms and shoulders, performed in standing, sitting, and lying (on back) positions and/or other positions. Optionally, with the clips in the lateral forward position, the device may used for various leg exercises (FIG. 9), which may be performed separately and/or at the same time as upper body exercises.

Figure 8B:
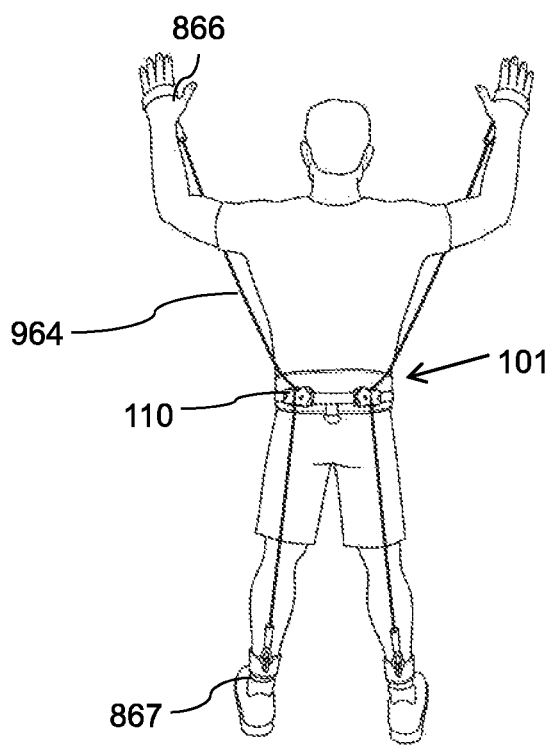
FIG. 8B is a perspective view person standing and exercising with clips in a rearward position in accordance with an embodiment of the present invention.
Figure 10A:
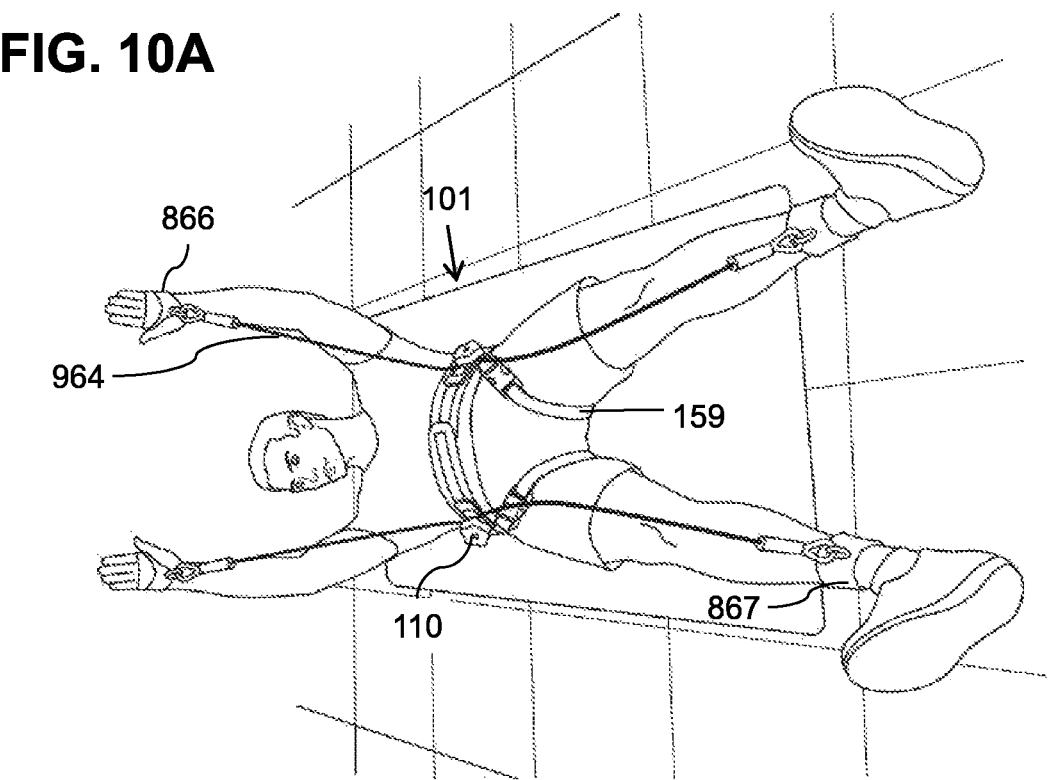
FIG. 10A is a perspective view person lying face up and exercising in accordance with an embodiment of the present invention.
Figure 10B:
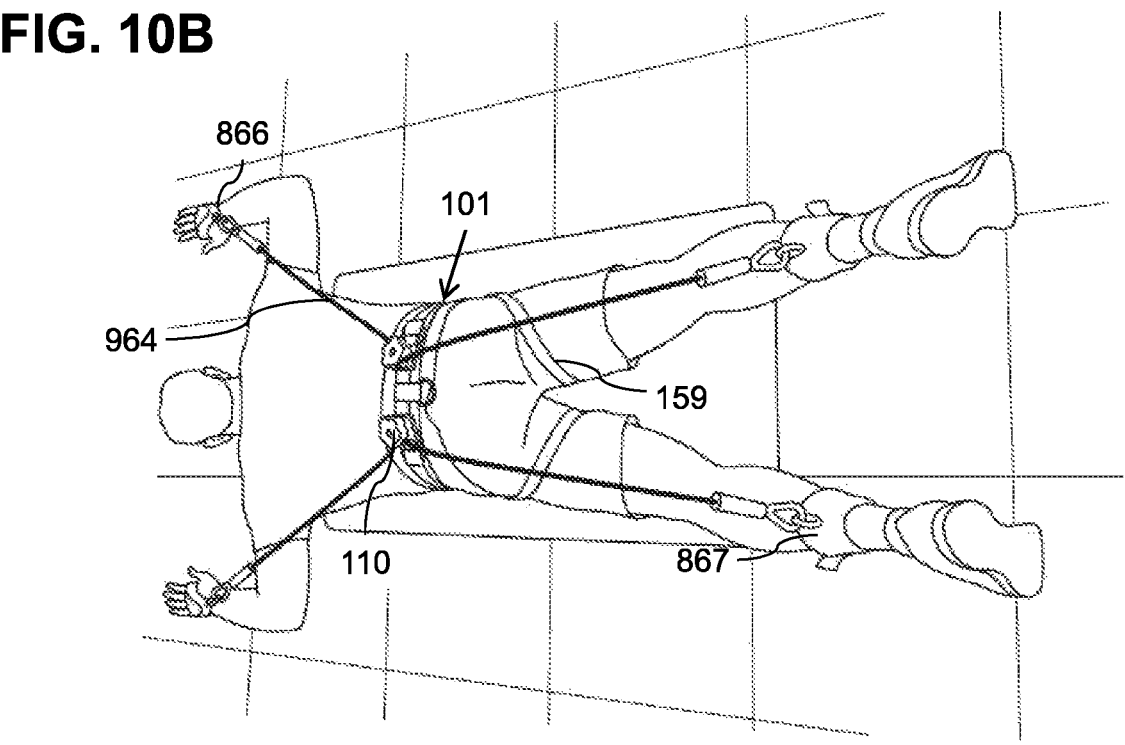
FIG. 10B is a perspective view person lying face down and exercising in accordance with an embodiment of the present invention.

FIGS. 8B and 10B illustrate deployment of clips 110 in a rear position, close to the user's spine, which can be useful for other exercises, also to be performed in standing, sitting or lying (on front, face down) positions, or any other position. For each type of exercise, the user chooses the appropriate anchoring position of the clips, the desired free length of bungee cord, and the number (or thickness) of cords to be used, thereby providing highly personalized adjustment of the device for optimal implementation of a wide range of exercise, rehabilitation and physiotherapy programs.

FIG. 8A illustrates a standing exercise using a belt system 101 with two clips 110 in a forward position. Optionally, on each side, a single elastic tension element 964 is attached to a right clip 110. The upper end of element 964 attaches by means of a band 866 to the right hand of the user. The lower end of element 964 attaches by means of a band 867 to the right foot of the user. Optionally, a differential resistance between the hand and the foot may be adjusted by changing the relative lengths of the top and bottom portions of element 964 (for example by moving element 964 inside clamp 110 for example as described above). For example, a user may adjust an unstressed free length of tension element 964 between 10 to 30 cm and/or between 30 to 150 cm and/or between 150 to 250 cm in any direction. Optionally elastic tension element 964 may include a bungee and/or a spring and/or another cord. Optionally a second elastic tension element is attached to a clip on the left side of the used and/or used for exercising the left hand and foot. The elastic modulus of the cord on the left side may differ from the elastic modulus of the cord on the right side.

FIG. 8B illustrates a standing exercise using a belt system 101 with two clips 110 in a rear position. For example, moving the position of the clips 110 may change the muscles being exercised. For example with the clips 110 in the forward position, resistance may preferentially be applied to the muscles in the rear of the legs and/or the back. For example with the clips 110 in the rearward position, resistance may be preferentially applied to the muscles in the front of the thighs and/or the chest.

Figure 8C:
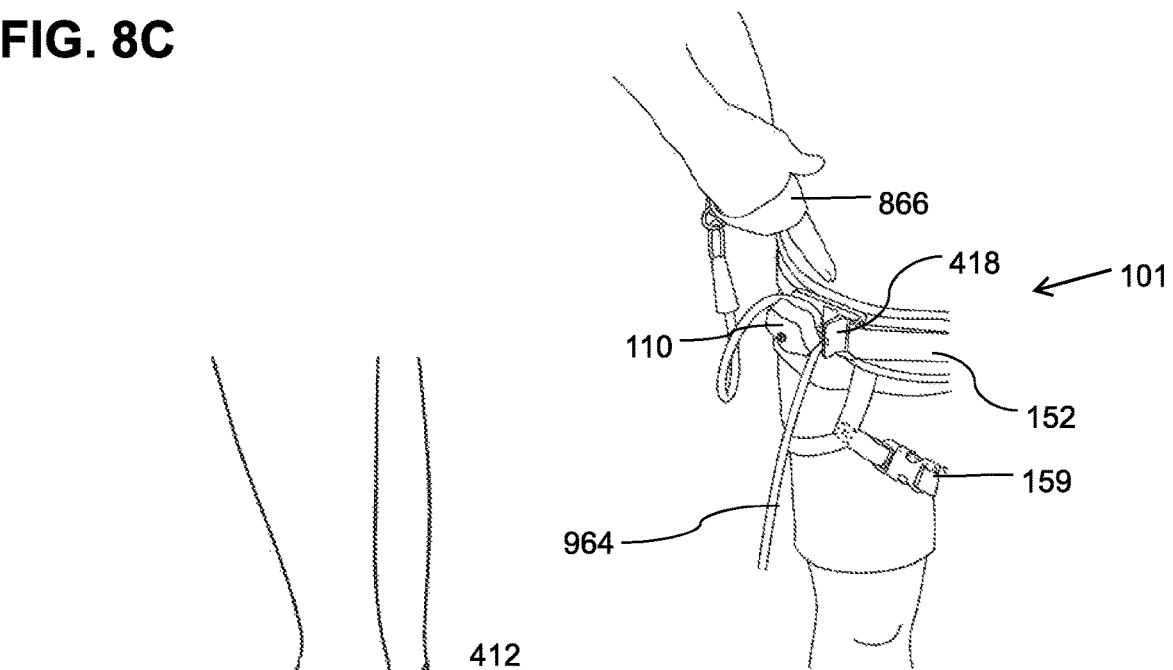
FIG. 8C is a perspective view person standing and wearing a belt with a clip holding a bungee in accordance with an embodiment of the present invention.

FIG. 8C illustrates repositioning a clip 110 on a belt system 101 in accordance with an embodiment of the current invention. For example, a locking element 418 is opened and/or the clip 110 is slid along the strap 152. System 101 is optionally designed that clip 110 can be repositioned with one hand while all the parts remain connected avoiding parts becoming disconnected, falling and/or getting lost.

Figure 8D:
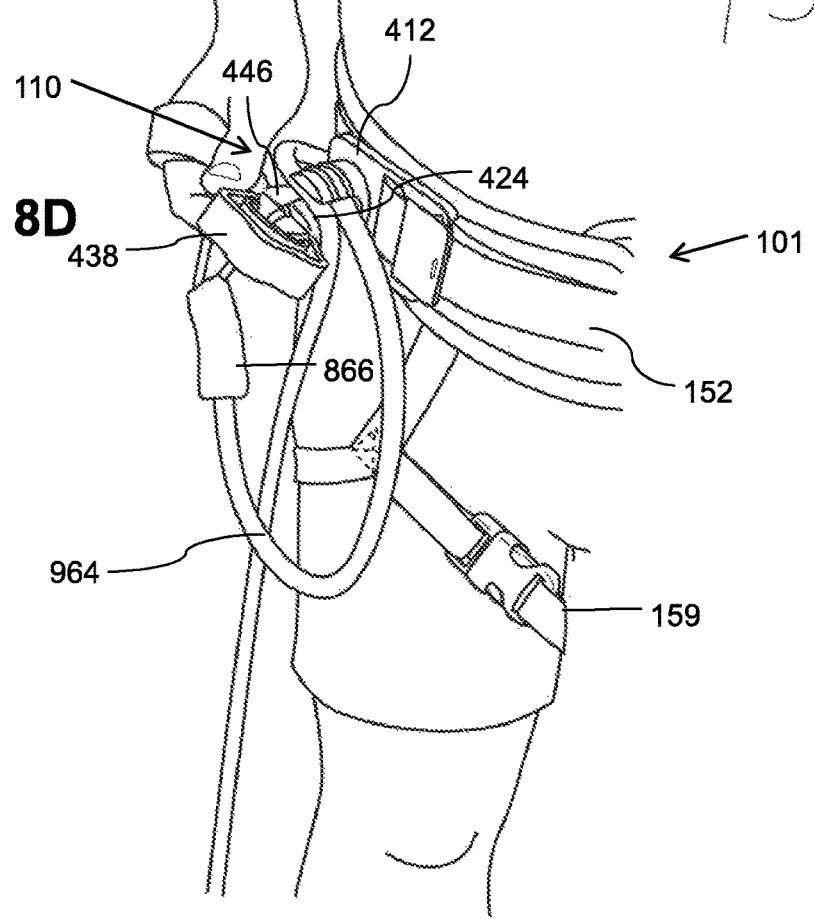
FIG. 8D is a perspective view person standing and wearing a belt with a clip in and two bungees in accordance with an embodiment of the present invention.

FIG. 8D illustrates changing a cord 964 on a clip 110 of a belt system 101 in accordance with an embodiment of the current invention. In some embodiments, a tightener 438 may be opened with one hand to release a cord 964. Optionally, in the fully open configuration, tightener is connected the rest of clip 110 by a retainer (e.g. retaining strip 446) such that it does not separate, fall and/or get lost. Optionally the retainer prevents cord 964 from falling away from clip 110 (for example when a use is wearing belt system 101 in an upright position, retaining strip 446 is position under a channel 424 in clip 110 such that if a cord 964 falls out of the channel it will be retained between retaining strip 446, base 412 and tightener 438 of clip 110). Optionally channel 424 is deep enough to retain two bungees without one being pushed out of the channel by the other. For example, the depth of the channel may be between 2 to 5 times its width and/or more than 5 times its width and/or the width may range between 0.5 mm to 2 cm the length of channel 424 may range for example, between 1 to 3 cm and/or between 3 to 8 cm.

In some embodiments, a belt system 101 is configured for independent adjustment of resistance to four limbs. For example, a subject may exercise four limbs simultaneously (for example as illustrated in FIGS. 8A, 8B, 10A and 10B). Optionally a resistance on each limb may be adjusted independently. For example a belt system 101 may include four elastic element and/or each elastic element may be attached to a different limb of a subject. Additionally or alternatively a length may be independently adjustable and/or a elasticity of each elastic element may be selected independently. For example, a belt system 101 may include two clips 110 and/or each clip 110 may hold two elastic tension elements 964. Optionally, each elastic tension element 964 may be attached and/or detached to independently and/or replaced independently. Optionally each clip may move independently.

Figure 9:
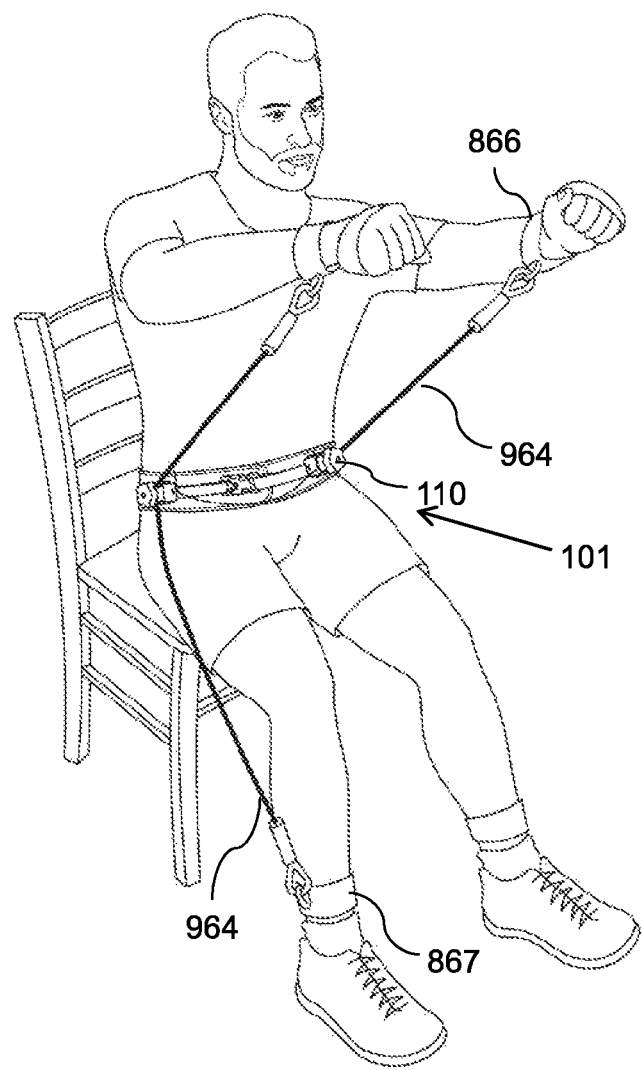
FIG. 9 is a perspective view person sitting and exercising in accordance with an embodiment of the present invention.

FIG. 9 illustrates a seated exercise in accordance with an embodiment of the current invention. For example, when seated, clips 110 may be moved toward the front and/or side of belt system 101 where they will not get between the user and his chair and/or cause discomfort. Optionally, a right clip 110 may be positioned differently from a left clip 110. For example, right clip 110 may be located at a lateral position while a left clip 110 may be positioned in a forward position. Optionally, the system is used for different limbs on a right and left side. For example, a right bungee 964 is used to exercise a right hand and foot while a left bungee 964 is used to exercise a left arm but not a left foot. The ability to custom adjust the resistance and/or position of resistance to different limbs gives flexibility in which how much resistance is applied to which limb and in what direction. This may be important, for example in advanced exercises for example for physiotherapy and/or professional athletes.

FIGS. 10A and 10B illustrated repositioning clips 110 on an exercise belt system 101 for example to avoid interfering with the position of a user in accordance with an embodiment of the current invention. The possibility of repositioning clips 110 may be important for physical therapy of people with limited movement who may not be able to adjust their position to fit a non-adjustable exercise device.

FIG. 10A illustrate exercises performed while a subject is lying on his back, face up in a supine position in accordance with an embodiment of the current invention. For example, when lying supine, clips 110 a positioned where they will not interfere between the subject and the floor (for example in the front position)

FIG. 10B illustrate exercises performed while lying face down in a prostrate position in accordance with an embodiment of the current invention. For example, when lying prone, clips 110 a positioned where they will not interfere between the subject and the floor (for example in the rear position)

In some embodiments, an exercise device may have more than 2 clips. Optionally, a user may change resistances of an exercise device over time. For example the user may change the length of elastic element and/or he may switch elements (having different elasticity) and/or change the number of elastic elements connected the belt system 101 to a given limb. For example, during an exercise session a user may reduce the resistance over time (for example due to fatigue). Alternatively or addition, a user may increase resistance over time as the subject gets better trained. In some embodiments, a user wearing a belt system may elastically connect the belt system to one or more immobile objects (for example a wall or tree) for example to practice maintaining a position against resistance. The user optionally will simultaneously connect one elastic element to the immobile object and another to a limb to practice simultaneously maintaining a position against resistance and/or performing limb movements against resistance. Alternatively or additionally, rather than an immobile object, a mobile object may be used, for example to train the user to gauge resistance to movement while performing limb movements.

Figure 11:
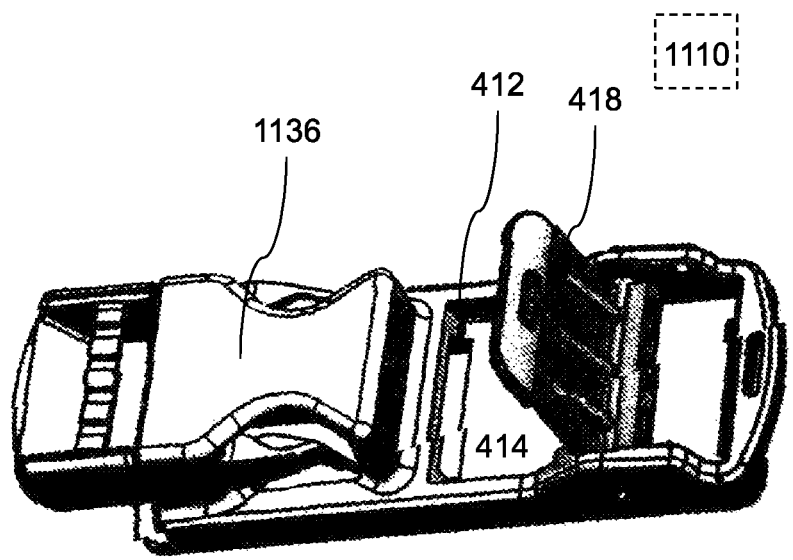
FIG. 11 is a perspective view of clip with a quick release fastener in accordance with an embodiment of the present invention.

Alternatively or additionally, two tension elements will be locked to a single clip 110. For example, one bungee having a first elastic modulus may be used for the hand and another with a different elastic modulus for the foot. Alternatively or additionally, a position of clip on one side may be different from a position of a clip on another side FIG. 11 illustrates a clip 1110 in accordance with an embodiment of the current invention. For example, clip 1110 includes a fastener 1136 that may include a quick connect buckle.

Figure 12:
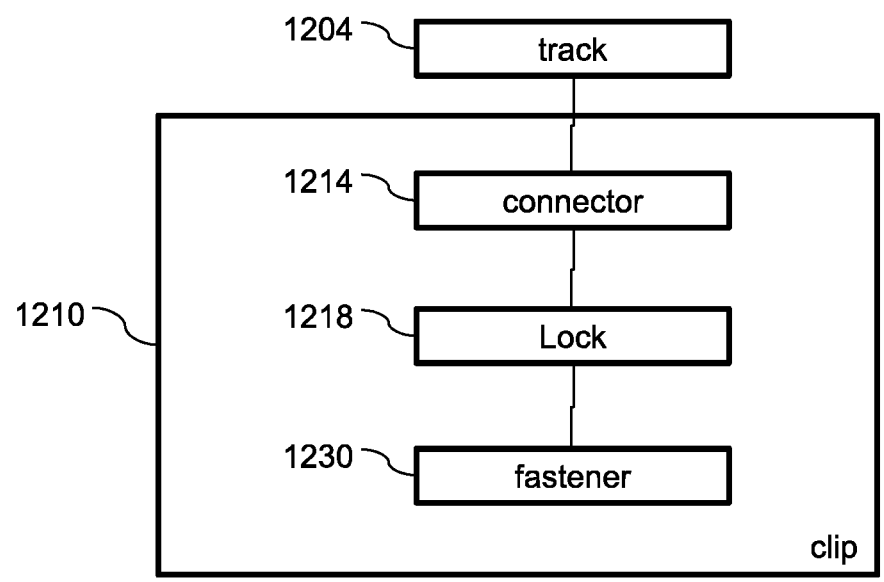
FIG. 12 is a block diagram of a attachment system in accordance with an embodiment of the current invention.

FIG. 12 is a block diagram of a attachment system in accordance with an embodiment of the current invention. In some embodiments, a the device includes a track 1204 and/or a clip 1210. Optionally, the clip 1210 in slideably connected to the track by a connector 1214 and/or can be locked (to prevent sliding with respect to the track) using a lock 1218. The clip 1110 optionally includes a fastener 1230.

In some embodiments a track 1204 may be connected to various objects. For example, track 1204 may be connected to a person, for example as a belt and/or as a strap going over the shoulder of the person and/or as a band around his arm. Alternatively or additionally a track 1204 may be connected to a fixed object for example a building and/or a tree. For example, the track 1204 may be wrapped around an object and/or hung on a hanger (e.g. a hook and/or a screw) attached to the object and/or adhered to the object etc. In some embodiments, a track 1204 includes a textile strap and/or a leather strap and/or a steel belt and/or a plastic belt.

In some embodiments, a connector 1214 to a track may include a full or partial ring and/or a tongue and/or a groove and/or a roller.

In some embodiments, a lock 1218 may include a friction brake and/or a pin for example fitting a hole in the track and/or a ratchet for example locking to an protrusion protruding from the track and/or threaded tightener and/or a toothed object (for example a gear).

In some embodiments, a fastener may include a various means to connect to various objects. For example, the fastener may include a clamping mechanism for clamping to cord and/or a rod and/or a bar. Alternatively or additionally, a fastener may include a hanger for example a hook and/or a ring and/or a carabiner. Alternatively or additionally, a fastener may include a quick connect. Alternatively or additionally, a fastener may include an externally and/or internally threaded connector. Alternatively or additionally, a fastener may include an open and/or closed channel. Alternatively or additionally, a fastener may include an open channel with a closure. Optionally, a fastener and/or a connector may include a retaining mechanism that keeps the system stable while adjusting a position of the clip on the track and/or connecting an object to the fastener and/or disconnecting an object from the fastener. For example the retainer may facilitate one handed use of the device, for example retaining various parts of the system while the user adjusts other parts.

Figure 13A:
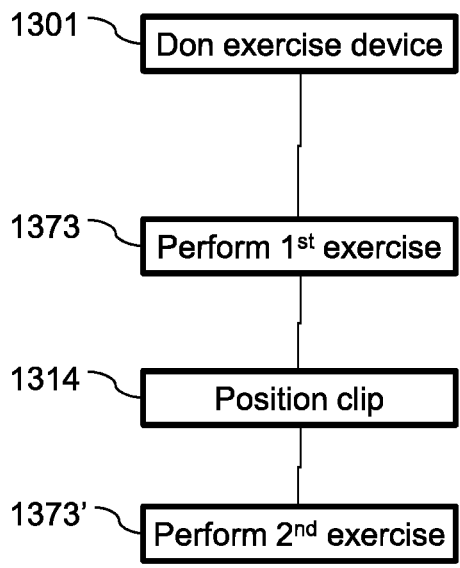
FIG. 13A is a flow chart illustration of a method of exercise in accordance with an embodiment of the current invention.

FIG. 13A is a flow chart illustration of a method of exercise in accordance with an embodiment of the current invention. Optionally, a wearable exerciser includes one or more movable clips holding one or more elastic resistance elements. The position of the clip may be adjusted according to the preference of the user, the exercise and/or the position of the user.

In some embodiments, a user may don 1301 an exercise device. For example the device may include strap having a movable clip. For example, the strap may be included in a harness over the shoulders and/or back. For the strap may be included in a belt system wrapped around waist of the user.

In some embodiments, a user may perform 1373 a first exercise. Optionally a clip may be positioned on the strap to facilitate the first exercise. For example, the first exercise may include the user positioning himself in a first position and/or the clips may be positioned to facilitate the positioning of the user. For example, the exercise may be performed lying face down and/or the clips may be positioned to the back of the user. Alternatively or additionally, a clip may be moved to provide a resistance in a preferred direction. For example, for exercising muscles of the back side of the leg, a clip may be positioned towards a front of the user's waist.

In some embodiments, after a first exercise, a user may perform 1373' a second exercise. Optionally a clip may be repositioned 1314 on the strap to facilitate the second exercise. For example, the second exercise may include the user positioning himself in a second position and/or the clips may be repositioned 1314 to facilitate the positioning of the user. For example, the exercise may be performed lying face up and/or the clips may be repositioned 1314 to the front of the user. Alternatively or additionally, a clip may be repositioned 1314 to provide a resistance in a preferred direction. For example, for exercising muscles of the front of the leg, a clip may be repositioned 1314 towards a back of the user's waist. In some embodiments, repositioning 1314 of a clip may include unlocking the clip from a retaining strap, moving the clip along the strap and/or relocking the clip to the strap. Optionally a strap will be repositioned 1314 to a predetermined location. For example, the predetermined position may be marked on the strap.

Figure 13B:
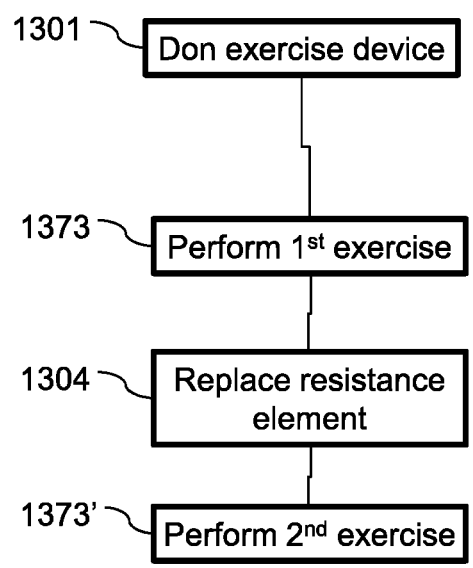
FIG. 13B is a flow chart illustration of a method of exercise in accordance with an embodiment of the current invention.

FIG. 13B is a flow chart illustration of a method of exercise in accordance with an embodiment of the current invention. Optionally, a wearable exerciser includes one or more replaceable elastic resistance elements. Elements may be changed according to the preference of the user, the exercise and/or the position of the user.

In some embodiments, a user may don 1301 an exercise device. For example the device may include strap one or more interchangeable resistance elements. For example, the resistance elements may include an elastic tension element such as a bungee.

In some embodiments, a user may perform 1373 a first exercise. Optionally a first resistance element will by attached to the clip to facilitate the first exercise.

In some embodiments, after a first exercise, a user may perform 1373' a second exercise. Optionally a resistance element may be replaced to facilitate the second exercise. For example, one bungee having a first elastic modulus may be used for the first exercise and another with a different elastic modulus the second exercise. Alternatively or additionally, replacing 1304 a resistance element may include increasing resistance by adding a further resistance element to an existing resistance element. Alternatively or additionally, replacing 1304 a resistance element may include decreasing resistance by removing a resistance element from an existing set of resistance elements. Optionally, a resistance element will include a marking. For example, the marking may facilitate positioning the element in a desired position and/or returning the element to a predetermined position. Optionally, a fastener for a resistance element may include a retaining mechanism that keeps the system stable while replacing 1304 the resistance element to the fastener and/or disconnecting the resistance element from the fastener. For example the retainer may facilitate one handed use of the device, for example retaining the resistance element and/or various parts of the fastener while the user replaces 1304 the resistance element.

Figure 14A:
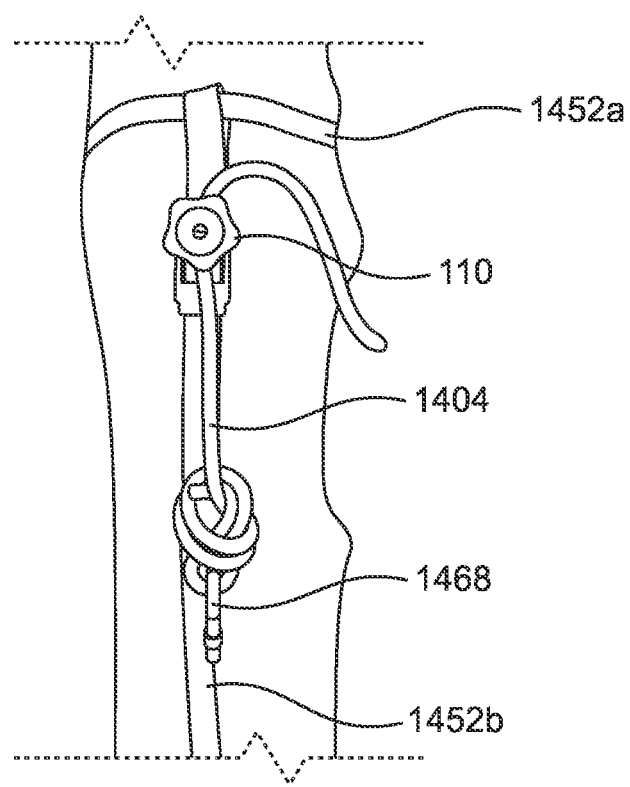
FIG. 14A illustrates a clip holding a rope supported on a strap on tree in accordance with an embodiment of the present invention.
Figure 14B:
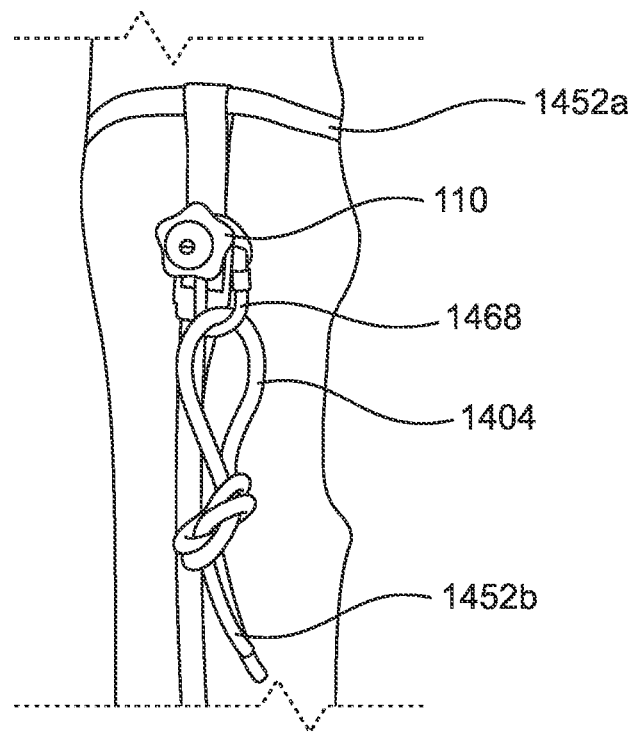
FIG. 14B illustrates a clip holding a carabiner supported on a strap on tree in accordance with an embodiment of the present invention.

FIG. 14A illustrates a clip 110 supported on a strap 1452*b* on tree in accordance with an embodiment of the present invention. For example, the fastener of clip 110 may be used to attach to a rope 1404. In the exemplary configuration, clip 110 can move up and down strap 1452*b*, raising the rope 1404 and a carabiner 1468 without changing the rope length. Alternatively or additionally, clip 110 may ride on strap 1452*a*. Optionally a backing (for example similar to belt 158) may be placed between strap 1452*a* and the tree for example to protect the tree and/or to make it easier to slide clip 110 along strap 1452*a* and/or to prevent fraying of strap 1452*a*.

FIG. 14A illustrates another configuration of the system of FIG. 14A. For example, the fastener of clip 110 may be used to hold the carabiner 1468 which may be attached to one or more ropes 1404 and/or other equipment.

In some embodiments strap 1452*a* may be attached to a pillar and/or a post and/or a wall and/or any convenient object. Alternatively or additionally a strap (for example strap 1452*b*) may be attached to an object such as a tree by another attachment method (for example nails and/or screws and/or a hook and/or a combination of attachment means).

Figure 14C:
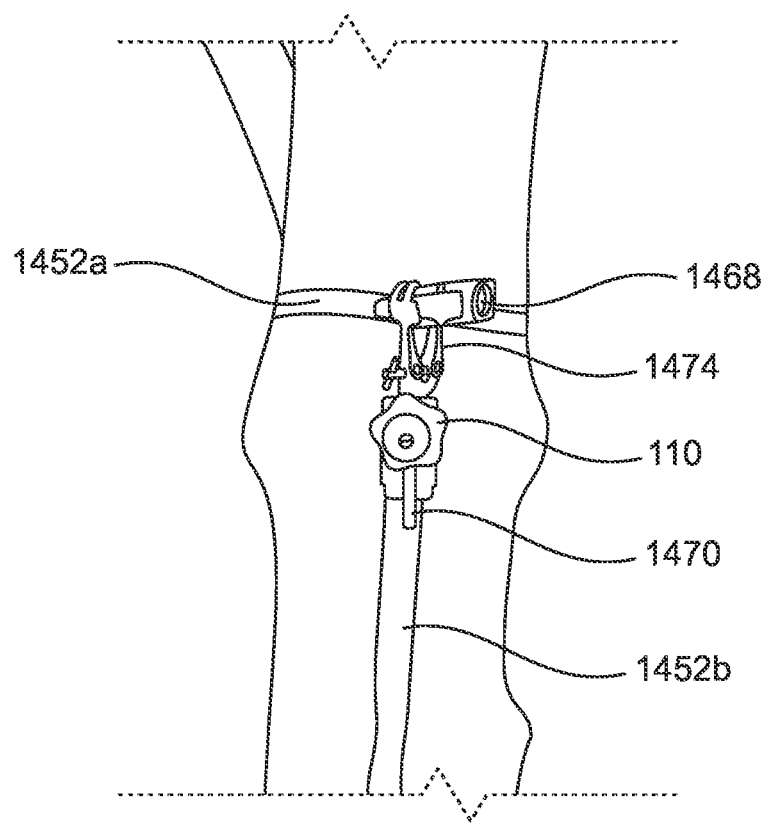
FIG. 14C illustrates a clip holding a light supported on a strap on tree in accordance with an embodiment of the present invention.

FIG. 14C illustrates a clip 110 holding a rod 1470 and/or a light 1468 in accordance with an embodiment of the current invention. For example, a clip 110 may be used by a photographer to adjustably position lights around a photography location. In some embodiments, a clip 110 may be used to hold a clamp 1474.

It is expected that during the life of a patent maturing from this application many relevant technologies will be developed and the scope of the terms fastener, connector, cord are intended to include all such new technologies a priori.

As used herein the term "about" refers to 10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A clip comprising:
  a connector for slidably connecting the clip to a textile strap said connector including a fastener with a channel having an opening for reversibly attaching and detaching an object to the clip;
  a closure for said opening having a closed position wherein said object is prevented from detaching from said fastener through said opening and said closure having an open position wherein said object can be detached from said fastener through said opening; and
  a retainer for retaining the closure to the clip in when said closure is in said open position,
    wherein said retainer includes a flexible strip rotatably connecting said closure to said channel,
    wherein said channel is sized and shaped to hold at least two bungees,
    wherein said closure is configured to fix a position of said at least two bungees in said channel and
    wherein said closure includes a knob and a screw thread for screwing to said channel by rotating with respect to said channel.

2. The clip of claim 1, further comprising
  a belt for holding said strap around a waist of a person and wherein said flexible strip is positioned below said channel such that when said belt is worn upright said strip underlies said channel and catches said bungees when they fall out of the channel.

3. A clip comprising:
  a connector for slidably connecting the clip to a textile strap said connector including a fastener with a channel having an opening for reversibly attaching and detaching an object to the clip;
  a closure for said opening having a closed position wherein said object is prevented from detaching from said fastener through said opening and an open position wherein said object can be detached from said fastener through said opening; and
  a retainer for retaining the closure to the clip in said open position,
    wherein said channel is sized and shaped to hold at least two bungees and wherein said retainer retains said closure within 5 cm of said channel in said open position.

4. The clip of claim 3, wherein said closure is configured to fix a position of said at least two bungees in said channel.

5. The clip of claim 4, wherein said closure includes a knob and a screw thread for screwing to said channel by rotating with respect to said channel.

6. The clip of claim 3, wherein said retainer includes a flexible strip rotatably connecting said closure to said channel and further comprising:
  a belt for holding said strap around a waist of a person and wherein said flexible strip is positioned below said channel such that when said belt is worn upright said strip underlies said channel and catches said bungees when they fall out of the channel.

7. An exercise device comprising:
  a belt including a strap; and
  a clip including
    a connector for slidably connecting the clip to said strap and
    a fastener for reversibly attaching and detaching a elastic tension element to the clip;
  a channel having an opening; and
  a closure for said fastener having a closed position closing said opening of said channel thereby preventing said elastic tension element from exiting the channel through said opening and said closure having an open position wherein said elastic tension element can be detached from said fastener through said opening; and
  a retainer for retaining the closure to the clip in said open position
    wherein said channel is sized and shaped to hold at least two bungees and
    wherein said closure includes a knob and a screw thread for screwing to said channel;
    a clamping jaw rotationally fixed with respect to said channel and sliding axially within said channel wherein said knob is joined to said clamping jaw to move axially with said clamping jaw and said knob rotates with respect to said clamping jaw and wherein said closure is configured to fix a position of said at least two bungees in said channel and wherein said tension element includes at least one of said at least two bungees.

8. The device of claim 7, further including:
  a second clip moving slideably attached to said strap and reversibly attached to at least two more elastic tension elements.

9. The device of claim 7, wherein said knob includes a fully tightened position wherein said at least two bungees are prevented from moving with respect to said channel, a loose position in which the at least two bungees can move longitudinally with respect to the channel but cannot be detached from the channel through said opening and an open position in which the at least two bungees can be detached from the channel through said opening.

10. The device of claim 9, wherein said retainer includes a flexible strip rotatably connecting said closure to said channel.

11. The device of claim 10, further comprising a belt for holding said strap around a waist of a person and wherein said flexible strip is positioned below said channel such that when said belt is worn upright said strip underlies said channel and catches said at least two bungees when they falls out of the channel.

12. The device of claim 7, wherein said retainer retains said closure within 5 cm of said channel in said open position.

* * * * *